US008175183B2

United States Patent
Nagahama et al.

(10) Patent No.: US 8,175,183 B2
(45) Date of Patent: May 8, 2012

(54) DIGITAL BROADCASTING RECEIVING APPARATUS

(75) Inventors: Hiroyuki Nagahama, Tokyo (JP); Mitsuru Takeuchi, Tokyo (JP); Eiji Arita, Tokyo (JP); Jun Ido, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 191 days.

(21) Appl. No.: 12/601,935

(22) PCT Filed: Jan. 16, 2008

(86) PCT No.: PCT/JP2008/050425
§ 371 (c)(1),
(2), (4) Date: Nov. 25, 2009

(87) PCT Pub. No.: WO2008/146495
PCT Pub. Date: Dec. 4, 2008

(65) Prior Publication Data
US 2010/0172429 A1 Jul. 8, 2010

(30) Foreign Application Priority Data
May 29, 2007 (JP) ................................. 2007-142212

(51) Int. Cl.
*H04B 7/02* (2006.01)
(52) U.S. Cl. ........ 375/267; 375/347; 375/148; 375/260; 455/277.1; 455/130; 455/272; 370/329; 370/343
(58) Field of Classification Search .................. 375/267, 375/148, 2, 60, 260, 347; 455/272, 562, 455/277.1, 130; 370/329, 343
See application file for complete search history.

(56) References Cited

U.S. PATENT DOCUMENTS

| | | | | |
|---|---|---|---|---|
| 5,809,019 A * | 9/1998 | Ichihara et al. | ............... | 370/334 |
| 7,043,275 B2 * | 5/2006 | Matsuoka et al. | .......... | 455/562.1 |
| 7,672,382 B2 * | 3/2010 | Yoshida et al. | ............... | 375/260 |
| 7,831,232 B2 * | 11/2010 | Nakaya | ...................... | 455/277.1 |
| 7,889,805 B2 * | 2/2011 | Kim et al. | ...................... | 375/267 |
| 2003/0032403 A1 | 2/2003 | Ono | | |
| 2005/0090205 A1 * | 4/2005 | Catreux-Erceg et al. | ....... | 455/78 |
| 2005/0245224 A1 * | 11/2005 | Kurioka | ......................... | 455/272 |
| 2007/0230639 A1 * | 10/2007 | Stirling-Gallacher | ........ | 375/347 |
| 2008/0151969 A1 * | 6/2008 | Reial | ............................. | 375/148 |
| 2009/0046638 A1 * | 2/2009 | Rappaport et al. | ............ | 370/329 |

FOREIGN PATENT DOCUMENTS

| | | |
|---|---|---|
| JP | 9-312601 A | 12/1997 |
| JP | 2000-151488 A | 5/2000 |
| JP | 2003-60539 A | 2/2003 |
| JP | 2003-283405 A | 10/2003 |
| JP | 2006-33056 A | 2/2006 |
| JP | 2006-174355 A | 6/2006 |

* cited by examiner

*Primary Examiner* — Eva Puente
(74) *Attorney, Agent, or Firm* — Birch, Stewart, Kolasch & Birch, LLP

(57) ABSTRACT

A digital broadcasting receiving apparatus is characterized in that the digital broadcasting receiving apparatus is provided with an antenna combination determination processing unit for selecting at least two antennas from among a plurality of antennas which have directivities in different directions and each of which receives a digital broadcasting wave transmitted from outside the digital broadcasting receiving apparatus, and for providing an instruction for switching among the above-mentioned plurality of antennas on the basis of a state of reception of the digital broadcasting waves received by the selected antennas, and switches for switching among the above-mentioned plurality of antennas according to the instruction from the above-mentioned combination determination processing unit.

10 Claims, 23 Drawing Sheets

(a) Directivity of Each Single Antenna (b) Combined Directivity of A1+A2

(c) Combined Directivity of B1+B2

(d) Combined Directivity of A2+B1

(e) Combined Directivity of A1+B2

In the Case in Which the Principal Wave Comes from the Front Side of the Vehicle In the Case in Which the Principal Wave Comes from the Rear Side of the Vehicle In the Case of Receiving the Principal Wave from the Left-Hand Side of the Vehicle, and Also Receiving the Delayed Wave from the Right-Hand Side of the Vehicle (SFN)

In the Case of Receiving the Principal Wave from the Right-Hand Side of the Vehicle, and Also Receiving the Delayed Wave from the Left-Hand Side of the Vehicle (SFN)

In the Case of Receiving the Principal Wave from the Left-Hand Side of the Vehicle, and Also Receiving the Delayed Wave from the Right-Hand Side of the Vehicle (Reflection from Mountains)

In the Case of Receiving the Principal Wave from the Right-Hand Side of the Vehicle, and Also Receiving the Delayed Wave from the Left-Hand Side of the Vehicle (Reflection from Mountains)

(a) Directivity of Each Single Antenna (b) Combined Directivity of A1+A2

(c) Combined Directivity of B1+B2

(d) Combined Directivity of A1+B2

(e) Combined Directivity of A2+B1

(a) Directivity of Each Single Antenna (b) Combined Directivity of A1+A2

(c) Combined Directivity of A1+B2

(d) Combined Directivity of A2+B1

(e) Combined Directivity of B1+B2

(a) Directivity of Each Single Antenna (b) Combined Directivity of A1+A2      (c) Combined Directivity of B1+B2

(d) Combined Directivity of A1+C2      (e) Combined Directivity of A2+C1

(f) Combined Directivity of B1+C2      (g) Combined Directivity of B2+C1

(h) Combined Directivity of A1+B2 (A2+B1)      (i) Combined Directivity of C1+C2

(a) Directivity of Each Single Antenna (b) Combined Directivity of A1+A2    (c) Combined Directivity of B1+B2

(d) Combined Directivity of
A1+C2 (A2+D1)

(e) Combined Directivity of
A2+C1 (A1+D2)

(f) Combined Directivity of
B1+C2 (B2+D1)

(g) Combined Directivity of
B1+D2 (B2+C1)

(h) Combined Directivity of
A1+B2 (A2+B1)

(i) Combined Directivity of
C1+C2 (D1+D2)

(j) Combined Directivity of D1+C2    (k) Combined Directivity of C1+D2 ns which have directivities in different directions and each of which receives a digital broadcasting wave transmitted from outside the digital broadcasting receiving apparatus, the digital broadcasting receiving apparatus selecting at least two antennas from among the plurality of antennas to perform diversity combining, is characterized in that the digital broadcasting receiving apparatus includes: a plurality of switches for switching among the above-mentioned plurality of antennas; an antenna combination determination processing unit for providing an instruction for switching among the above-mentioned plurality of antennas for each and every of the above-mentioned plurality of switches on a basis of a state of reception of digital broadcasting waves received by the above-mentioned selected antennas; and a switch control unit for providing an instruction for switching among the above-mentioned plurality of switches for the above-mentioned plurality of switches according to the instruction from the above-mentioned combination determination processing unit.

DIGITAL BROADCASTING RECEIVING APPARATUS

FIELD OF THE INVENTION

The present invention relates to a digital broadcasting receiving apparatus which is provided with a plurality of antennas and performs diversity combining.

BACKGROUND OF THE INVENTION

There has been provided a conventional digital broadcasting receiving apparatus which, in order to reduce the influence of a Doppler shift caused by movements of a vehicle, includes two antennas having directivities in a frontward direction and two antennas having directivities in a backward direction, and which compares the received powers of the above-mentioned two antennas having directivities in the frontward direction with those of the above-mentioned two antennas having directivities in the backward direction, and receives digital broadcasting waves by using the two antennas having higher received powers and then performs diversity combining on the digital broadcasting waves (for example, refer to patent reference 1).

Furthermore, there has been provided a conventional digital broadcasting receiving apparatus which, in order to improve the capability of receiving a digital broadcasting wave, carries out comparison and judgment by using a CN value (Carrier/Noise) which is the ratio of the career of the digital broadcasting wave and noise, as well as the received power of the digital broadcasting wave (for example, refer to patent reference 2).

[Patent reference 1] JP,2003-283405,A
[Patent reference 2] JP,2006-33056,A

Conventional digital broadcasting receiving apparatuses are constructed as mentioned above, and can simply switch between two groups of antennas having the same directivity, but cannot perform diversity combining of digital broadcasting waves received thereby by selecting some of all the antennas independently. Therefore, a problem is that, in order to provide antenna directivities in forward, backward, leftward and rightward directions, there is a necessity to dispose a total of eight antennas including two antennas in each and every of all the directions, and therefore conventional digital broadcasting receiving apparatuses are restricted by the installing space of the antennas and the outward appearance of the vehicle. A further problem is that because the antennas of a conventional digital broadcasting receiving apparatus exhibit a directivity in a single direction after the digital broadcasting receiving apparatus has performed diversity combining, when the difference between the angle of arrival of the principal wave of a digital broadcasting wave and that of the delayed wave of the digital broadcasting wave which has arrived at the digital broadcasting receiving apparatus after a delay of a guard time interval or more with respect to the above-mentioned principal wave is small, the receiving capability of receiving the digital broadcasting wave cannot be improved.

The present invention is made in order to solve the above-mentioned problems, and it is therefore an object of the present invention to provide a digital receiving apparatus that can provide a combined directivity in one of various directions by carrying out diversity combining with a combination of antennas having directivities in different directions.

DISCLOSURE OF THE INVENTION

A digital broadcasting receiving apparatus in accordance with the present invention provided with a plurality of antennas which have directivities in different directions and each of which receives a digital broadcasting wave transmitted from outside the digital broadcasting receiving apparatus, the digital broadcasting receiving apparatus selecting at least two antennas from among the plurality of antennas to perform diversity combining, is characterized in that the digital broadcasting receiving apparatus includes: a plurality of switches for switching among the above-mentioned plurality of antennas; an antenna combination determination processing unit for providing an instruction for switching among the above-mentioned plurality of antennas for each and every of the above-mentioned plurality of switches on a basis of a state of reception of digital broadcasting waves received by the above-mentioned selected antennas; and a switch control unit for providing an instruction for switching among the above-mentioned plurality of switches for the above-mentioned plurality of switches according to the instruction from the above-mentioned combination determination processing unit.

When selecting at least two of the plurality of antennas having directivities in the different directions to perform diversity combining, the digital broadcasting receiving apparatus in accordance with the present invention provides an instruction for switching among the above-mentioned plurality of antennas for each and every of the switches on the basis of the reception states of the digital broadcasting waves received by the above-mentioned selected antennas. Therefore, the present invention offers an advantage of being able to provide a combined directivity in one of various directions with a combination of some of the above-mentioned plurality of antennas, and can therefore improve the receiving capability of the digital broadcasting receiving apparatus.

BRIEF DESCRIPTION OF THE FIGURES

FIG. 3-1 is a diagram showing a case in which the principal wave of a digital broadcasting wave comes from a front side of a vehicle with respect to the traveling direction of the vehicle;

FIG. 3-2 is a diagram showing a case in which the principal wave of a digital broadcasting wave comes from a rear side of the vehicle with respect to the traveling direction of the vehicle;

FIG. 3-3 is a diagram showing a case in which the principal wave of a digital broadcasting wave comes from a left-hand side of the vehicle with respect to the traveling direction of the vehicle, and the delayed wave of the digital broadcasting wave comes from a right-hand side of the vehicle with respect to the traveling direction of the vehicle;

FIG. 3-4 is a diagram showing a case in which the principal wave of a digital broadcasting wave comes from the right-hand side of the vehicle with respect to the traveling direction of the vehicle, and the delayed wave of the digital broadcasting wave comes from the left-hand side of the vehicle with respect to the traveling direction of the vehicle;

FIG. 3-5 is a diagram showing the case in which the principal wave of a digital broadcasting wave comes from a left-hand side of the vehicle with respect to the traveling direction of the vehicle, and the delayed wave of the digital broadcasting wave comes from a right-hand side of the vehicle with respect to the traveling direction of the vehicle;

FIG. 3-6 is a diagram showing the case in which the principal wave of a digital broadcasting wave comes from the right-hand side of the vehicle with respect to the traveling direction of the vehicle, and the delayed wave of the digital broadcasting wave comes from the left-hand side of the vehicle with respect to the traveling direction of the vehicle;

FIG. 4 is a diagram showing another example of the directivities of the antennas of the digital broadcasting receiving apparatus in accordance with Embodiment 1;

FIG. 5 is a diagram showing a further example of the directivities of the antennas of the digital broadcasting receiving apparatus in accordance with Embodiment 1;

FIG. 6 is a flow chart showing the operation of the digital broadcasting receiving apparatus in accordance with Embodiment 1;

FIG. 7-1 is a flow chart in a case of using received power values $P_A$ and $P_B$ as a criterion for determination;

FIG. 7-2 is a flow chart in a case of using $CN_A$ and $CN_B$ as a criterion by which to determine whether or not to perform switching of the antennas;

FIG. 7-3 is a flow chart in a case of using an error rate Ec as a criterion by which to determine whether or not to perform switching of the antennas;

FIG. 7-4 is a flow chart in a case of using whether a predetermined time interval has elapsed as a criterion by which to determine whether or not to perform switching of the antennas;

FIG. 7-5 is a flow chart in a case of using delay profiles $t_A$ and $t_B$ as a criterion by which to determine whether or not to perform switching of the antennas;

FIG. 7-6 is a flow chart in a case of using whether the digital broadcasting receiving apparatus is searching for a digital broadcasting wave or performing a channel selecting process as a criterion by which to determine whether or not to perform switching of the antennas;

FIG. 7-7 is a flow chart in a case of using both a value $P_A \times CN_A$ which is the multiplication of the received power value $P_A$ and the C/N value $CN_A$ and a value $P_B \times CN_B$ which is the multiplication of the received power value $P_B$ and the C/N value $CN_B$ as a criterion by which to determine whether or not to perform switching of the antennas;

FIG. 7-8 is a flow chart in a case of using error rates $E_A$ and $E_B$ as a criterion by which to determine whether or not to perform switching of the antennas;

FIG. 7-9 is a flow chart in a case of using a broadcasting format as a criterion by which to determine whether or not to perform switching of the antennas;

FIG. 8-1 is a flow chart in a case of using the received power values $P_A$ and $P_B$ to perform a process of determining whether or not to switch among the antennas;

FIG. 8-2 is a flow chart in a case of using the CN values $CN_A$ and $CN_B$ to perform the process of determining whether or not to switch among the antennas;

FIG. 8-3 is a flow chart in a case in which the antenna combination determination processing unit uses the error rates $E_A$ and $E_B$ to perform the process of determining whether or not to switch among the antennas;

FIG. 8-4 is a flow chart in a case of using both the value $P_A \times CN_A$ which is the multiplication of the received power value $P_A$ and the C/N value $CN_A$ and the value $P_B \times CN_B$ which is the multiplication of the received power value $P_B$ and the C/N value $CN_B$ to perform the process of determining whether or not to switch among the antennas;

FIG. 8-5 is a flow chart in a case of using both a time delay TA included in the delay profile $t_A$ and a time delay TB included in the delay profile $t_B$ to perform the process of determining whether or not to switch among the antennas;

FIG. 8-6 is a flow chart in a case of using both a received power difference $DU_A$ included in the delay profile $t_A$ and a received power difference $DU_B$ included in the delay profile $t_B$ to perform the process of determining whether or not to switch among the antennas;

FIG. 8-7 is a flow chart in a case of using the result of the previous switching to perform the process of determining whether or not to switch among the antennas;

FIG. 8-8 is a flow chart in a case in which the antenna combination determination processing unit performs, as the process of determining whether or not to switch among the antennas, a process of, after continuously performing a switching process of switching between the antennas of the same branch a predetermined number of times, switching between the antennas of another branch;

FIG. 8-9 is a flow chart in a case in which the antenna combination determination processing unit performs, as the process of determining whether or not to switch among the antennas, a process of, after continuously performing a switching process of switching between the antennas of the same branch a predetermined number of times during a predetermined time interval, switching between the antennas of another branch;

FIG. 9 is a block diagram of a digital broadcasting receiving apparatus in accordance with Embodiment 2;

FIG. 13-1 is a flow chart showing the operation of a digital broadcasting receiving apparatus in accordance with Embodiment 4; and FIG. 13-2 is a flow chart showing the operation of the digital broadcasting receiving apparatus in accordance with Embodiment 4.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
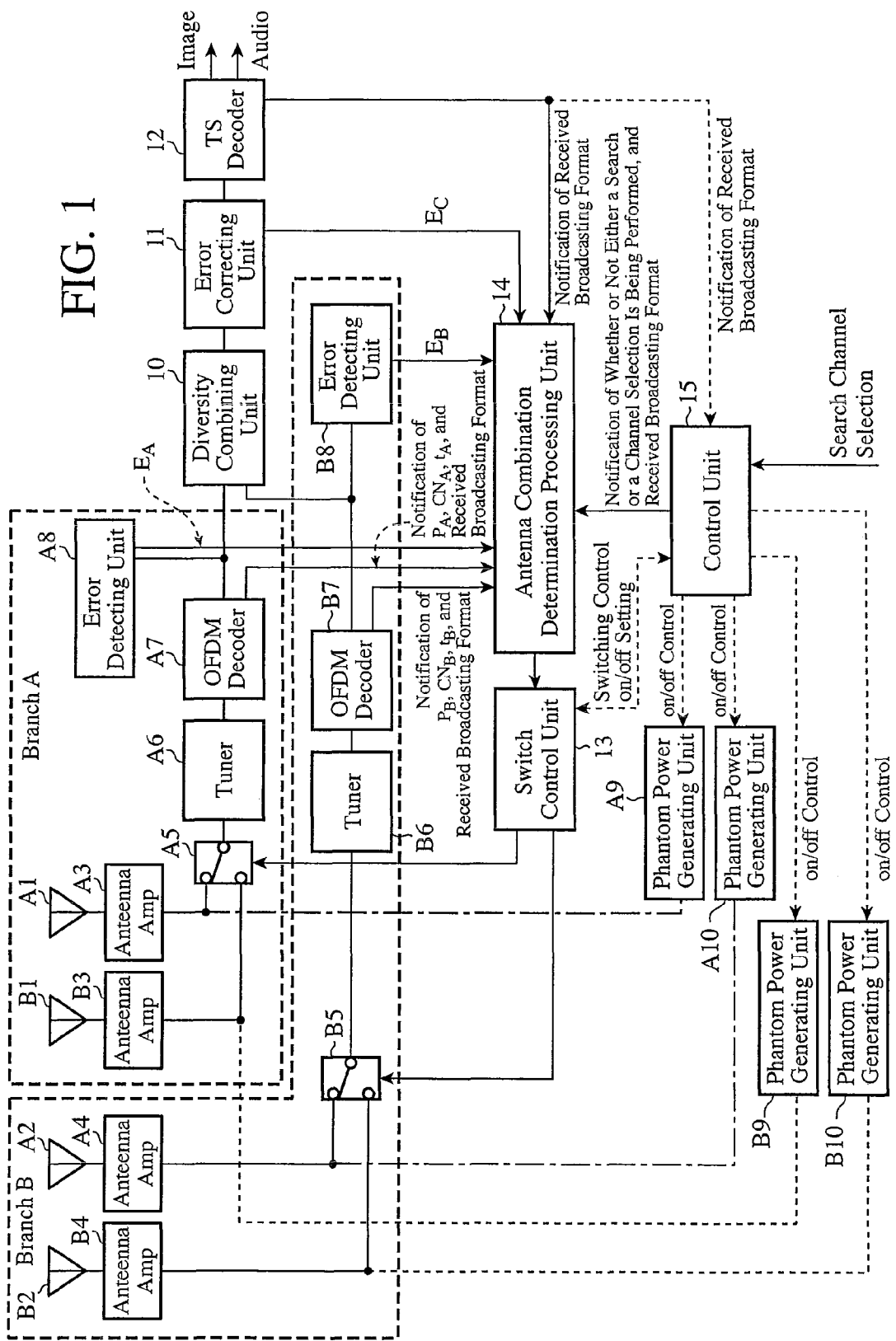
FIG. 1 is a block diagram of a digital receiving apparatus in accordance with Embodiment 1.

FIG. 1 is a block diagram of a digital broadcasting receiving apparatus in accordance with Embodiment 1. The digital broadcasting receiving apparatus in accordance with the present Embodiment 1 is provided with antennas A1 and B1, antenna amplifiers A3 and B3, a switch A5, a tuner A6, an OFDM (Orthogonal Frequency Division Multiplexing) decoder A7, an error detecting unit A8 which construct a branch A, antennas A2 and B2, antenna amplifiers A4 and B4, a switch B5, a tuner B6, an OFDM decoder B7, an error detecting unit B8 which construct a branch B, a diversity combining unit 10, an error correcting unit 11, a TS (Transport Stream) decoder 12, a switch control unit 13, an antenna combination determination processing unit 14, a control unit 15, phantom power generating units A9 and A10, and phantom power generating units B9 and B10.

Each of the antennas A1, B1, A2, and B2 receive a digital broadcasting wave transmitted from a broadcasting station, a base station, or the like. The antenna amplifiers A3, B3, A4, and B4 respectively amplify the digital broadcasting waves received by the antennas A1, B1, A2, and B2. The switch A5 switches between the antennas A1 and B1, and the switch B5 switches between the antennas A2 and B2. The tuner A6 converts the digital broadcasting wave received by the antenna selected by the switch A5 into an IF (Intermediate Frequency) signal and outputs this IF signal, and the tuner B6 converts the digital broadcasting wave received by the antenna selected by the switch B5 into an IF signal and outputs this IF signal.

The OFDM decoder A7 is provided with a received level detecting unit for detecting the received power value of the IF signal outputted from the tuner A6, an A/D (Analog/Digital) converting unit for converting the above-mentioned analog IF signal into a digital signal, and a signal processing unit for performing an FFT (Fast Fourier Transform) process, an IFFT (Inverse Fast Fourier Transform) process, or the like on the A/D converted digital signal, and has a function of performing an A/D conversion process, an FFT process, or the like on the IF signal outputted from the tuner A6, and also detecting and outputting the received power $P_A$ of the above-mentioned IF signal, $CN_A$ which is the ratio (CN value) of the career to noise, a delay profile $t_A$ including a time delay TA which is the difference between the arrival time of the principal wave of the digital broadcasting wave and that of the delayed wave of the digital broadcasting wave, and $DU_A$ which is the difference between the received power of the above-mentioned principal wave and that of the above-mentioned delayed wave, the description of the transmission control signal based on the broadcasting format of the digital broadcasting wave, e.g. BS digital broadcasting format or digital terrestrial broadcasting format, whether the digital broadcasting wave is a one-segment broadcasting one or a 12-segment broadcasting one, and so on. The received level detecting unit of the OFDM decoder A7 can be located either before or after the A/D converting unit.

The OFDM decoder B7 is provided with a received level detecting unit for detecting the received power value of the IF signal outputted from the tuner B6, an A/D (Analog/Digital) converting unit for converting the above-mentioned analog IF signal into a digital signal, and a signal processing unit for performing an FFT (Fast Fourier Transform) process, an IFFT (Inverse Fast Fourier Transform) process, or the like on the A/D converted digital signal, and has a function of performing an A/D conversion process, an FFT process, or the like on the IF signal outputted from the tuner B6, and also detecting and outputting the received power $P_B$ of the above-mentioned IF signal, $CN_B$ which is the ratio (CN value) of the career to noise, a delay profile $t_B$ including a time delay TB which is the difference between the arrival time of the principal wave of the digital broadcasting wave and that of the delayed wave of the digital broadcasting wave, and $DU_B$ which is the difference between the received power of the above-mentioned principal wave and that of the above-mentioned delayed wave, the description of the transmission control signal based on the broadcasting format of the digital broadcasting wave, e.g. BS digital broadcasting format or digital terrestrial broadcasting format, whether the digital broadcasting wave is a one-segment broadcasting one or a 12-segment broadcasting one, and so on. The received level detecting unit of the OFDM decoder B7 can be located either before or after the A/D converting unit.

The error detecting unit A8 detects and outputs an error rate $E_A$ of the signal outputted from the OFDM decoder A7, and the error detecting unit B8 detects and outputs an error rate $E_B$ of the signal outputted from the OFDM decoder B7. The diversity combining unit 10 diversity-combines the signals respectively outputted from the OFDM decoder A7 and the OFDM decoder B7 to output a diversity combined signal. The error correcting unit 11 makes an error correction to the combined signal which is outputted from the diversity combining unit 10, and then outputs the error-corrected signal and also detects and outputs an error rate Ec of the above-mentioned signal. The TS decoder 12 demultiplexes and decodes the signal outputted from the error correcting unit 11 into an image signal, an audio signal, and an other information signal, and then outputs these signals. The TS decoder 12 further outputs the description of the transmission control signal based on the broadcasting format of the digital broadcasting wave, e.g. BS digital broadcasting format or digital terrestrial broadcasting format, whether the digital broadcasting wave is a one-segment broadcasting one or a 12-segment broadcasting one, and, furthermore, a channel ID which can be discriminated by the TS decoder, etc. to both the antenna combination determination processing unit 14 and the control unit 15.

The antenna combination determination processing unit 14 has a storage unit for storing thresholds which respectively correspond to the received power $P_A$, the CN value $CN_A$ and the delay profile $t_A$ which are outputted from the OFDM decoder A7, the error rate $E_A$ outputted from the error detecting unit A8, the received power $P_B$, the CN value $CN_B$ and the delay profile $t_B$ which are outputted from the OFDM decoder B7, the error rate $E_B$ outputted from the error detecting unit B8, and the error rate $E_C$ outputted from the error correcting unit 11, and information indicating a predetermined broadcasting format, and a timer unit for counting up to a predetermined time interval. The antenna combination determination processing unit 14 compares the received powers $P_A$ and $P_B$, the CN values $CN_A$ and $CN_B$, the delay profiles $t_A$ and $t_B$, the error rates $E_A$, $E_B$, and $E_C$ with their respective thresholds stored in the above-mentioned storage unit, and instructs the switch control unit 13 so as to switch among the antennas on the basis of both the results of the comparison and the count acquired by the timer.

The antenna combination determination processing unit 14 does not instruct the switch control unit 13 to switch among the antennas in either of a case in which the broadcasting format of the digital broadcasting wave outputted from the OFDM decoder A7 or B7, the TS decoder 12, or the control unit 15 matches the predetermined broadcasting format shown by the information stored in the above-mentioned storage unit, a case in which the antenna combination determination processing unit receives a signal indicating an instruction for instructing a channel selection of a digital broadcasting wave or a search for a digital broadcasting wave, which has been generated through a user's operation, from the control unit 15, and a case in which the above-mentioned timer has not counted up to the predetermined time interval. The switch control unit 13 instructs each of the switches A5 and B5 to switch between the antennas according to the instruction from the antenna combination determination processing unit 14. The phantom power generating units A9 and A10 respectively supply electric power to the antenna amplifiers A3 and A4, and the phantom power generating units B9 and B10 respectively supply electric power to the antenna amplifiers B3 and B4.

FIG. 2(a) is a diagram showing an example of the directivity of each of the antennas of the digital broadcasting receiving apparatus in accordance with Embodiment 1. The antenna A1 has a directivity in a direction of a front right-hand side of a vehicle. The antenna B1 has a directivity in a direction of a rear side of the vehicle. The antenna A2 has a directivity in a front left-hand side of the vehicle. The antenna B2 has a directivity in a direction of the rear side of the vehicle. FIG. 2(b) is a diagram showing a combined directivity which is acquired when the antennas A1 and A2 are combined, FIG. 2(c) is a diagram showing a combined directivity which is acquired when the antennas B1 and B2 are combined, FIG. 2(d) is a diagram showing a combined directivity which is acquired when the antennas A2 and B1, and FIG. 2(e) is a diagram showing a combined directivity which is acquired when the antennas A1 and B2.

Figure 2:
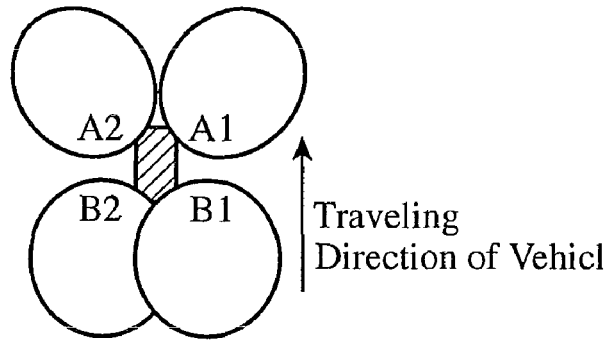
FIG. 2 is a diagram showing an example of the directivities of antennas of the digital broadcasting receiving apparatus in accordance with Embodiment 1.
Figure 2:
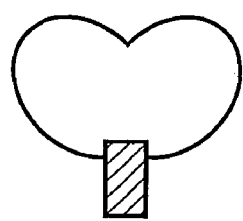
Figure 2:
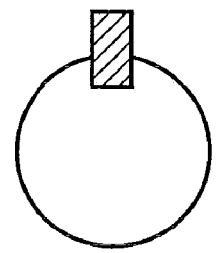
Figure 2:
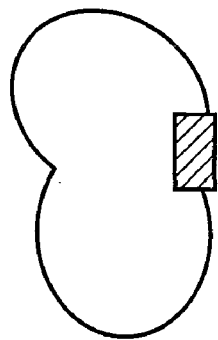
Figure 2:
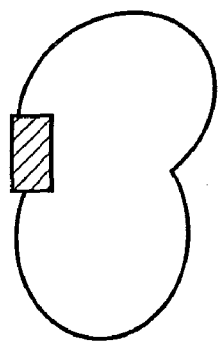
Figures 1, 3:
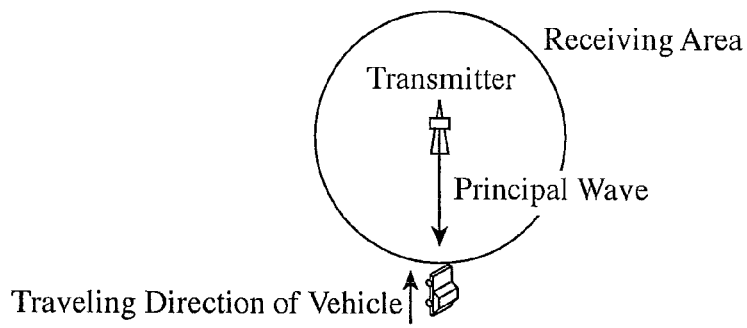
Figures 2, 3:
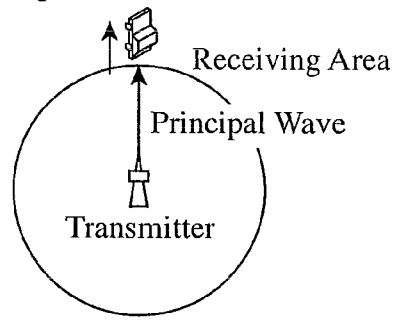
Figure 3:
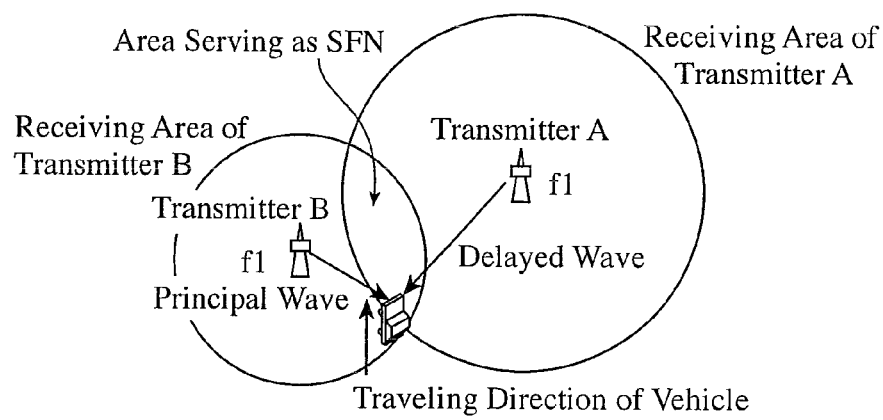
Figures 3, 4:
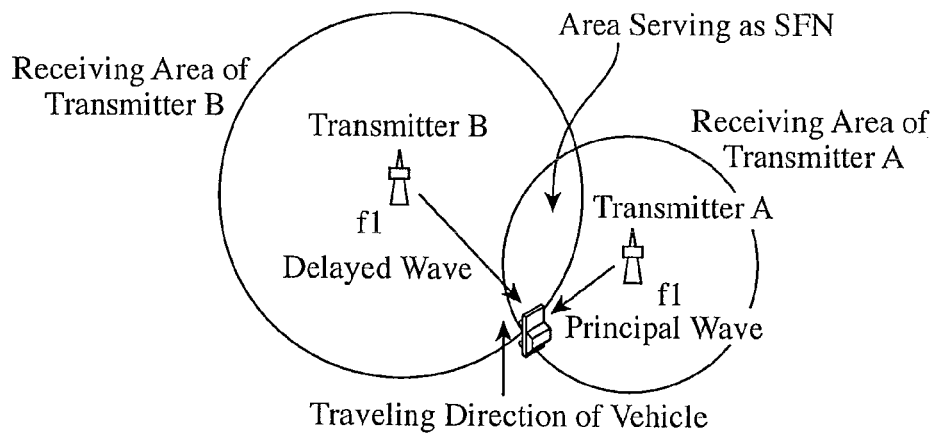
Figures 3, 4, 5:
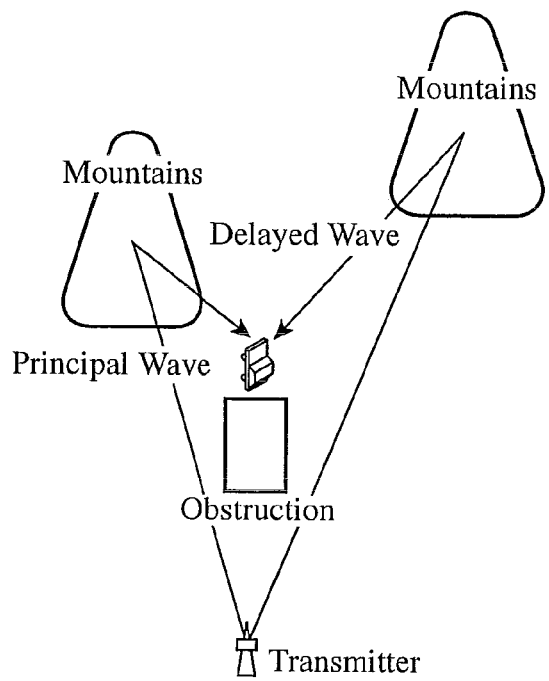

FIG. 3 is a diagram showing a direction of arrival from which the digital broadcasting wave arrives at the digital broadcasting receiving apparatus. FIG. 3-1 shows a case in which the principal wave of the digital broadcasting wave comes from a front side of the vehicle with respect to the traveling direction of the vehicle, and, in such the case, the reception state of the digital broadcasting receiving apparatus becomes the best one when the antennas A1 and A2 are combined to produce a combined directivity as shown in FIG. 2(b). FIG. 3-2 shows a case in which the principal wave of the digital broadcasting wave comes from a rear side of the vehicle with respect to the traveling direction of the vehicle, and, in such the case, the reception state of the digital broadcasting receiving apparatus becomes the best one when the antennas B1 and B2 are combined to produce a combined directivity as shown in FIG. 2(c). FIGS. 3-3 and 3-5 show a case in which the principal wave of the digital broadcasting wave comes from the left-hand side of the vehicle and the delayed wave of the digital broadcasting wave comes from the right-hand side of the vehicle with respect to the traveling direction of the vehicle, and, in such the case, the reception state of the digital broadcasting receiving apparatus becomes the best one when the antennas A2 and B1 or the antennas A2 and B2 are combined to produce a combined directivity as shown in FIG. 2(d). FIGS. 3-4 and 3-6 show a case in which the principal wave of the digital broadcasting wave comes from the right-hand side of the vehicle and the delayed wave of the digital broadcasting wave comes from the left-hand side of the vehicle with respect to the traveling direction of the vehicle, and, in such the case, the reception state of the digital broadcasting receiving apparatus becomes the best one when the antennas A1 and B2 or the antennas A1 and B1 are combined to produce a combined directivity as shown in FIG. 2(e).

FIG. 4(a) is a diagram showing another example of the directivity of each of the antennas of the digital broadcasting receiving apparatus in accordance with Embodiment 1. The antenna A1 has a directivity in a direction of the front right-hand side of the vehicle. The antenna B1 has a directivity in a direction of a rear right-hand side of the vehicle. The antenna A2 has a directivity in the front left-hand side of the vehicle. The antenna B2 has a directivity in a direction of a rear left-hand side of the vehicle. FIG. 4(b) is a diagram showing a combined directivity which is acquired when the antennas A1 and A2 are combined, FIG. 4(c) is a diagram showing a combined directivity which is acquired when the antennas B1 and B2 are combined, FIG. 4(d) is a diagram showing a combined directivity which is acquired when the antennas A1 and B2 are combined, and FIG. 4(e) is a diagram showing a combined directivity which is acquired when the antennas A2 and B1 are combined.

FIG. 5(a) is a diagram showing another example of the directivity of each of the antennas of the digital broadcasting receiving apparatus in accordance with Embodiment 1. The antenna A1 has a directivity in a direction of the front side of the vehicle. The antenna B1 has a directivity in a direction of a right-hand side of the vehicle. The antenna A2 has a directivity in a direction of the front side of the vehicle. The antenna B2 has a directivity in a direction of a left-hand side of the vehicle. FIG. 5(b) is a diagram showing a combined directivity which is acquired when the antennas A1 and A2 are combined, FIG. 5(c) is a diagram showing a combined directivity which is acquired when the antennas A1 and B2 are combined, FIG. 5(d) is a diagram showing a combined directivity which is acquired when the antennas A2 and B1 are combined, and FIG. 5(e) is a diagram showing a combined directivity which is acquired when the antennas B1 and B2 are combined.

Next, the operation of the digital broadcasting receiving apparatus will be explained.

Figures 3, 4, 5, 6:
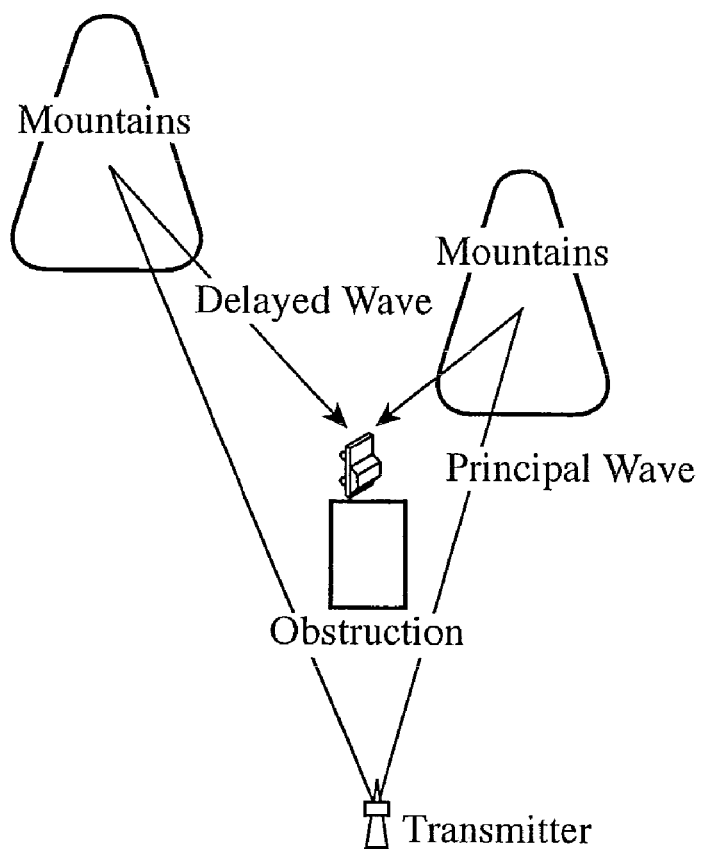
Figure 4:
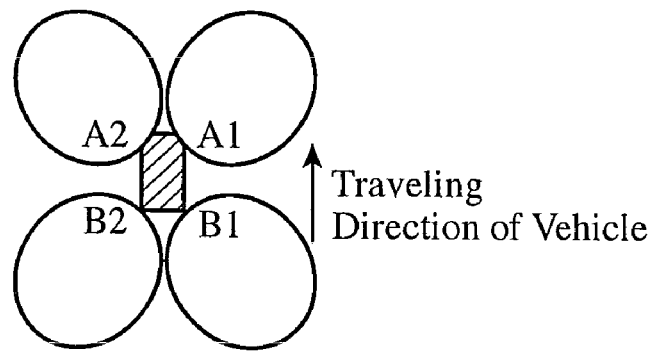
Figure 4:
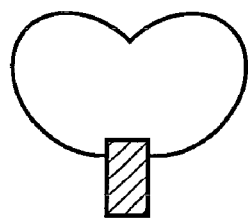
Figure 4:
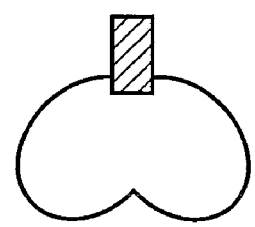
Figure 4:
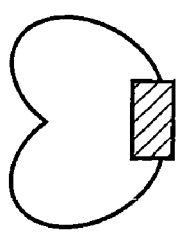
Figure 4:
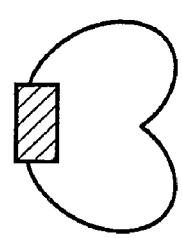
Figure 5:
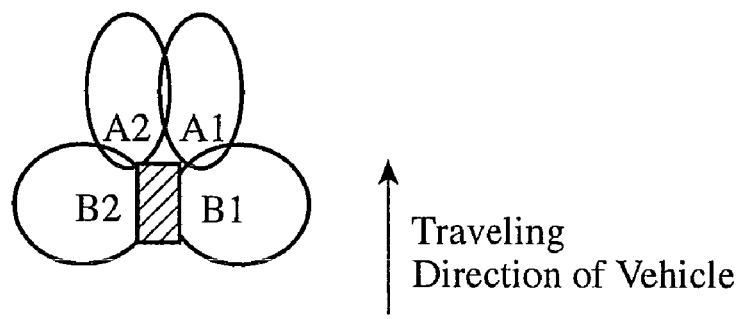
Figure 5:
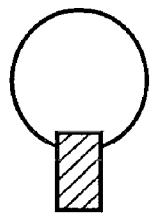
Figure 5:
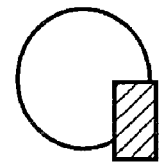
Figure 5:
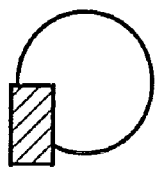
Figure 5:
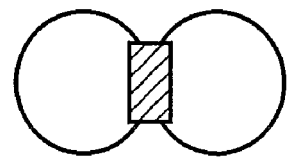
Figure 6:
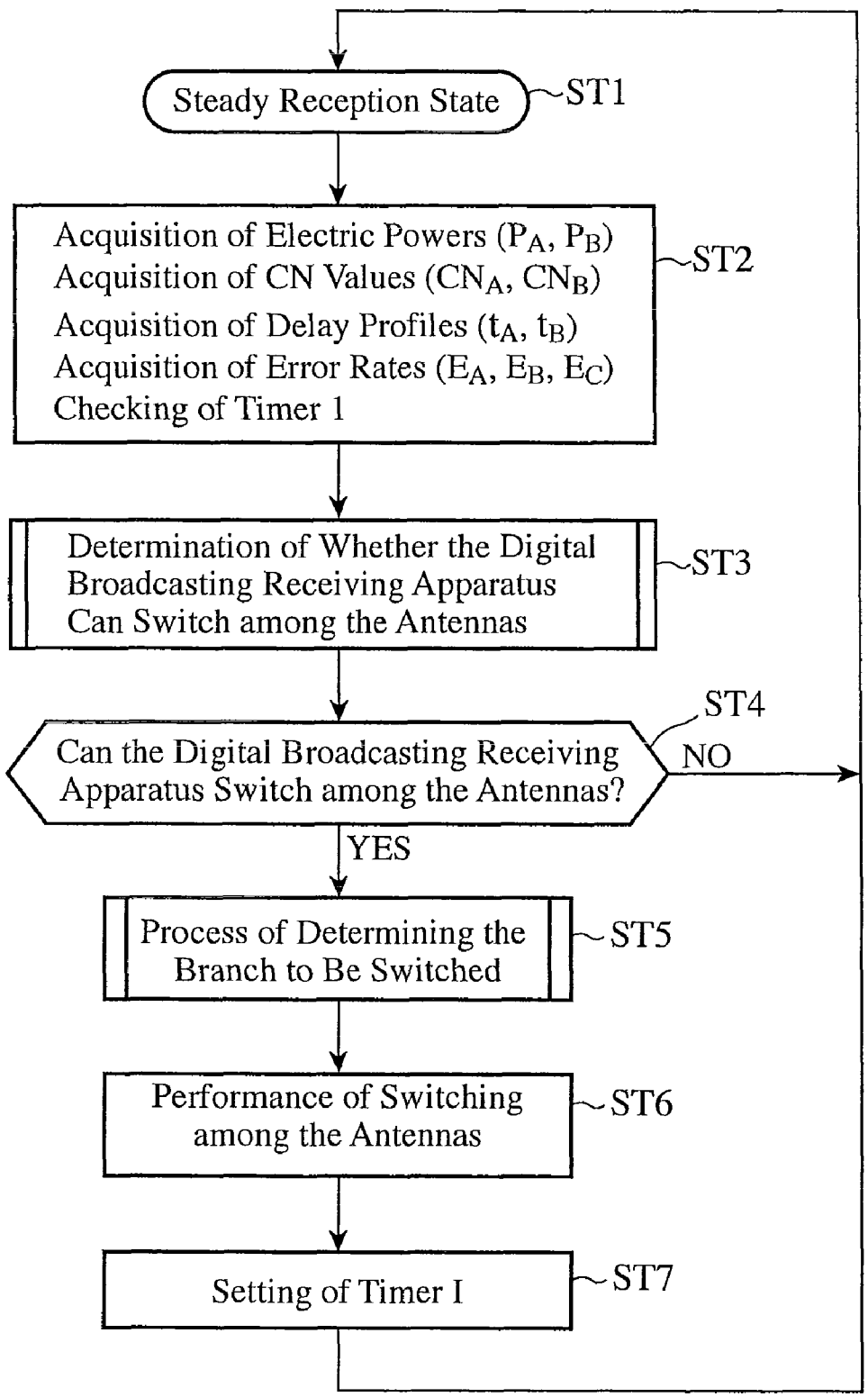

FIG. 6 is a flow chart showing the operation of the digital broadcasting receiving apparatus in accordance with the present Embodiment 1. Hereafter, the operation of the antenna combination determination processing unit 14 which is a feature of the digital broadcasting receiving apparatus in accordance with the present Embodiment 1 will be explained.

In a steady reception state, the antenna combination determination processing unit 14 acquires the received power $P_A$ and $CN_A$, which are outputted from the OFDM decoder A7, and the difference TA between the propagation time of the principal wave and that of the delayed wave and the difference $DU_A$ between the received power of the principal wave and that of the delayed wave, which are included in the delay profile $t_A$ outputted from the OFDM decoder A7, the error rate $E_A$ outputted from the error detecting unit A8, the received power $P_B$ and $CN_B$, which are outputted from the OFDM decoder B7, and the difference TB between the propagation time of the principal wave and that of the delayed wave and the difference $DU_B$ between the received power of the principal wave and that of the delayed wave, which are included in the delay profile $t_B$ outputted from the OFDM decoder B7, the error rate $E_B$ outputted from the error detecting unit B8, and the error rate $E_C$ outputted from the error correcting unit 11, and also checks whether the timer has counted the predetermined time interval (step ST2).

The antenna combination determination processing unit 14 then determines whether the digital broadcasting receiving apparatus can switch among the antennas on the basis of the values acquired in step ST2 (step ST3). The details of the process of step ST3 will be mentioned below with reference to FIGS. 7-1 to 7-9. When, in step ST3, determining that the digital broadcasting receiving apparatus cannot switch among the antennas, the antenna combination determination processing unit 14 returns to the steady reception state of step ST1 without switching among the antennas (step ST4). In contrast, when, in step ST3, determining that the digital broadcasting receiving apparatus can switch among the antennas, the antenna combination determination processing unit 14 performs a process of determining the branch to be switched (step ST5). The details of the process of step ST5 will be mentioned below with reference to FIGS. 8-1 to 8-9. The combination processing unit 14 then instructs each of the switches A5 and B5 to switch between the antennas on the basis of the determination of step ST5 (step ST6). Next, the combination processing unit 14 sets the timer and returns to the steady reception state of step ST1 (step ST7).

Figures 1, 7:
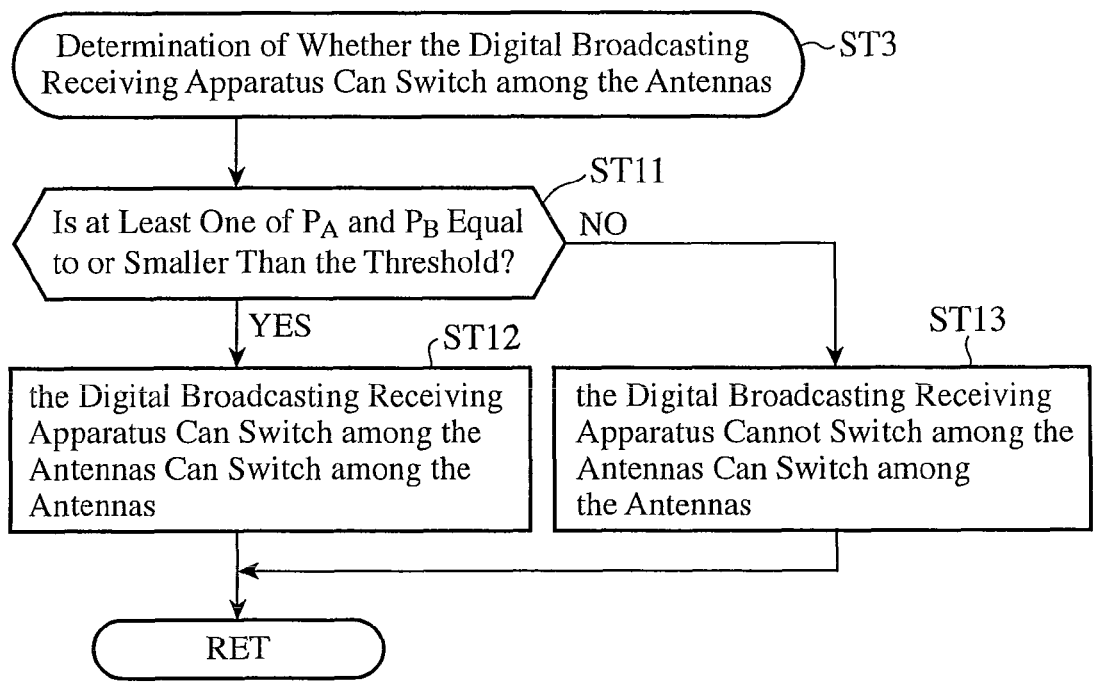
Figures 2, 7:
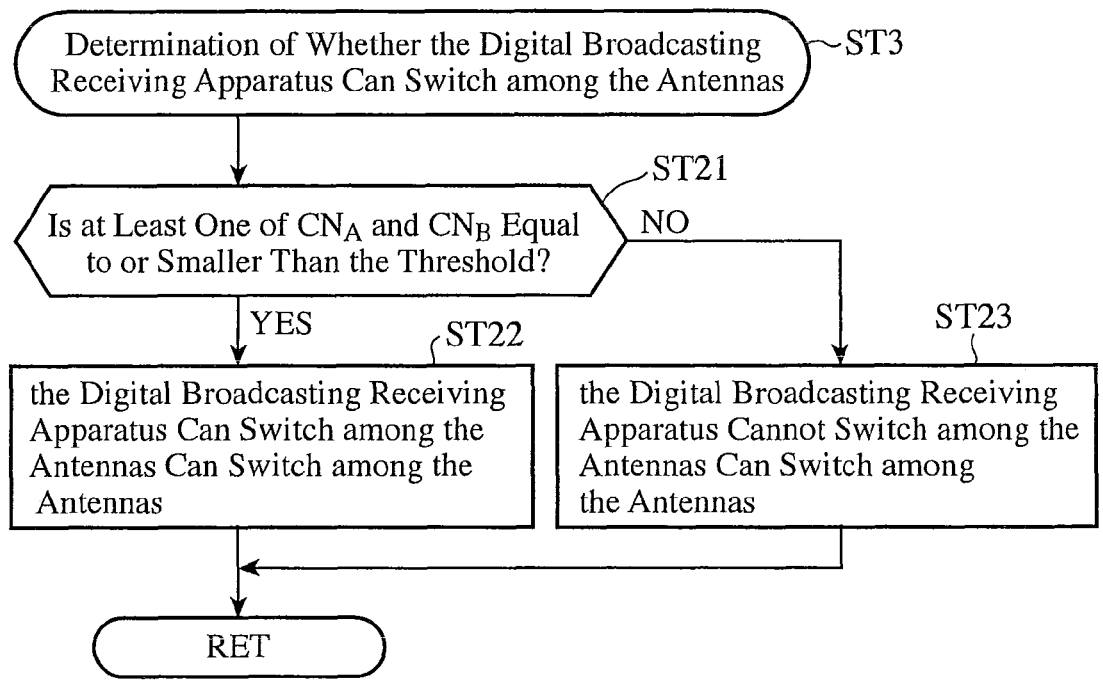
Figures 3, 7:
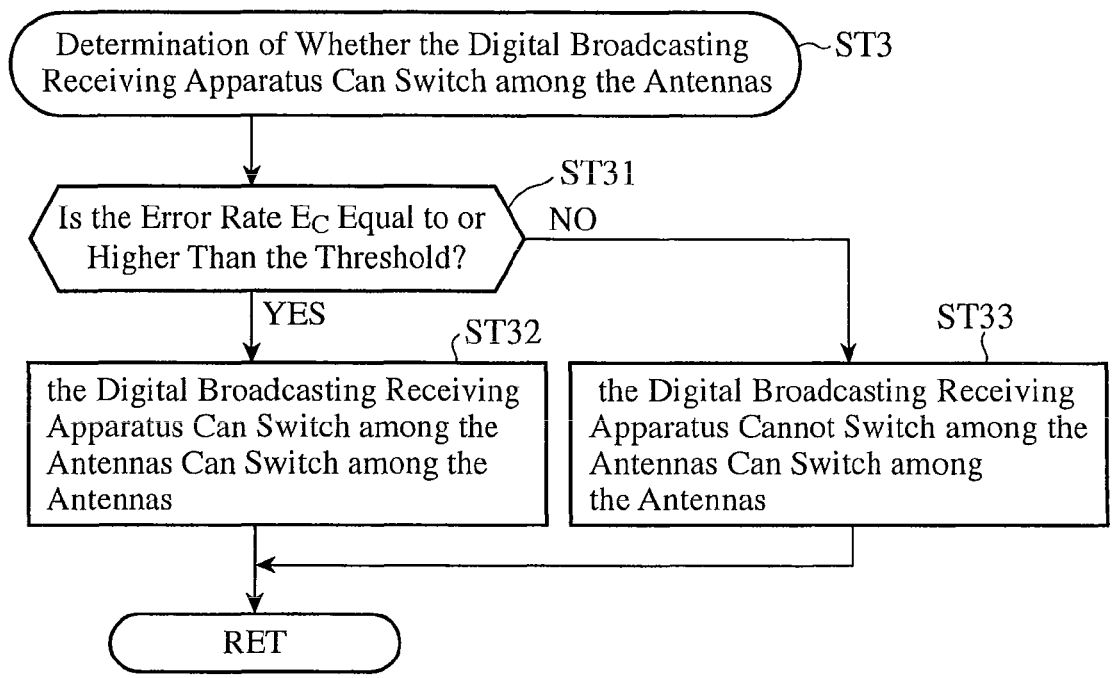
Figures 4, 7:
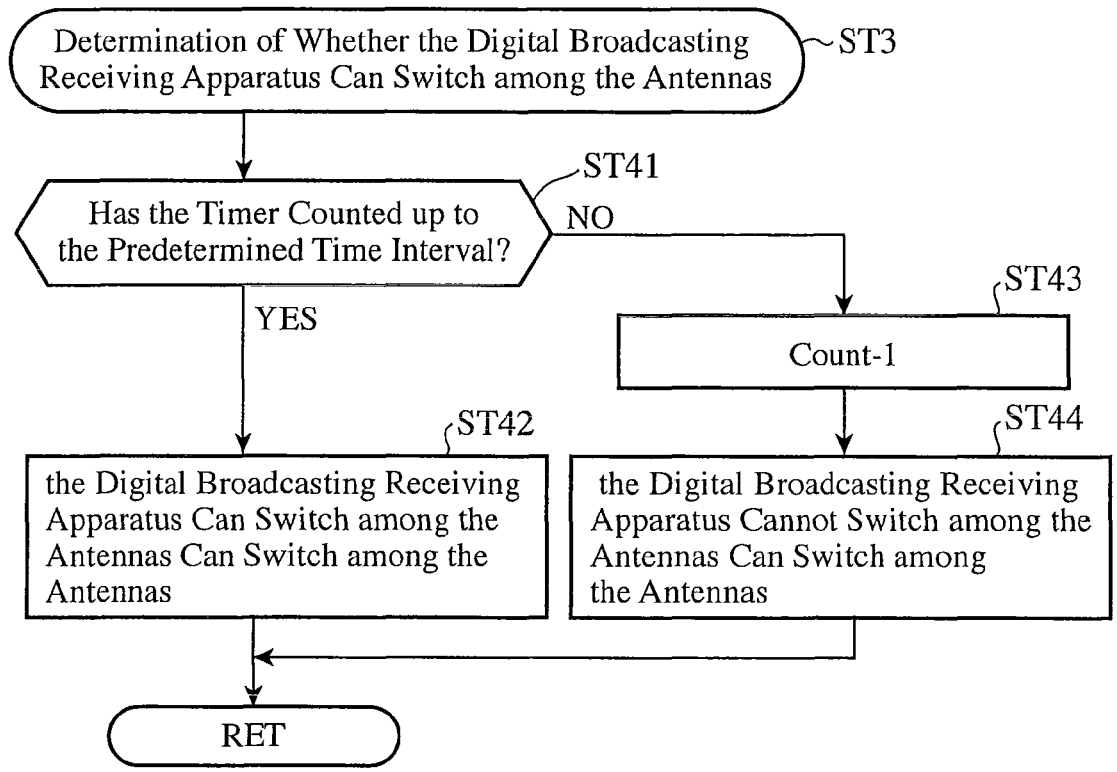
Figures 5, 7:
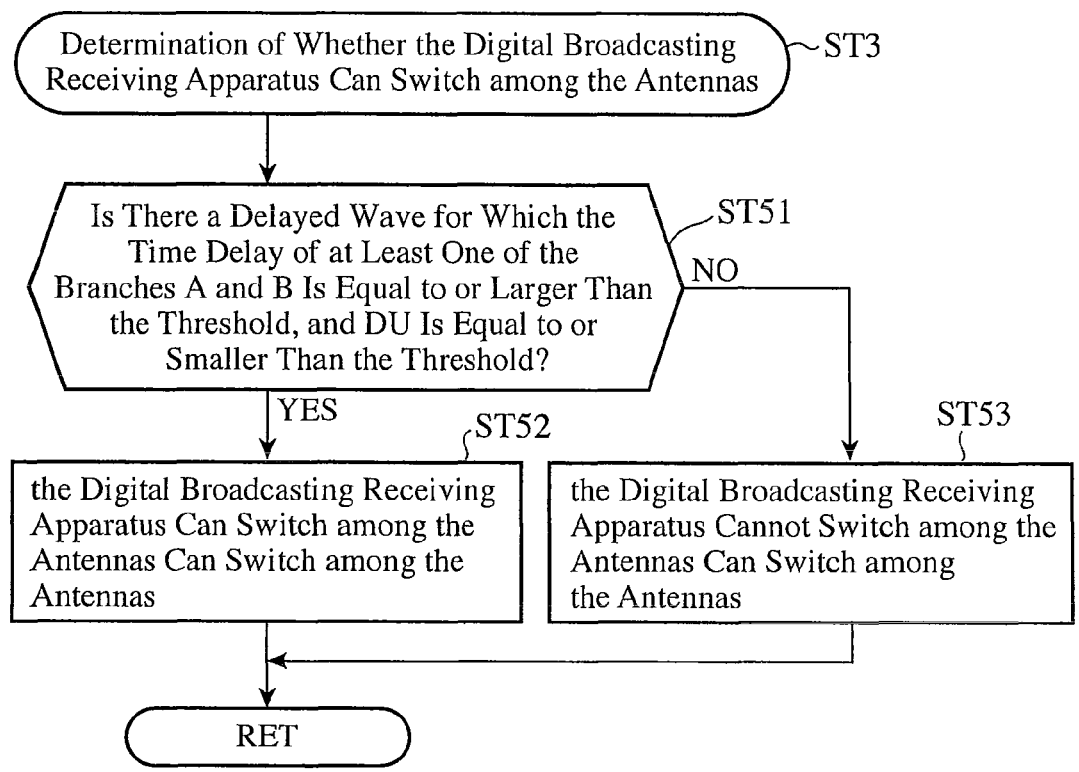
Figures 6, 7:
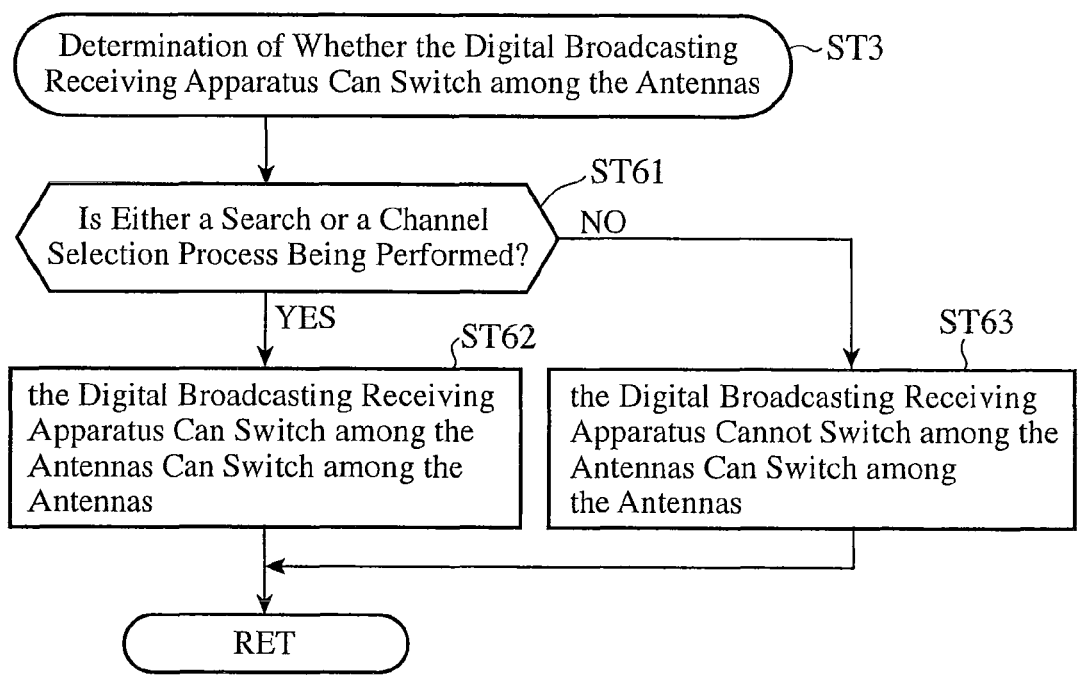
Figure 7:
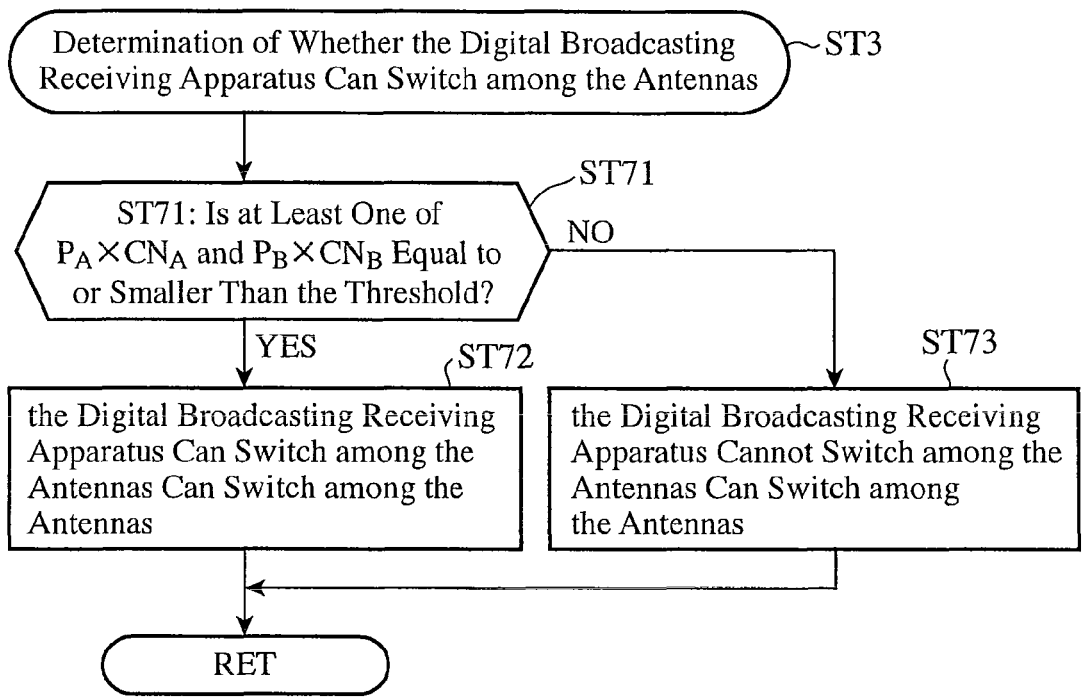

FIGS. 7-1 to 7-9 are flow charts showing the process of step ST3 of FIG. 6. FIG. 7-1 is a flow chart in a case in which the antenna combination determination processing unit uses the received power values $P_A$ and $P_B$ as a criterion for the determination. The antenna combination determination processing unit 14 determines whether or not at least one of the received power values $P_A$ and $P_B$ respectively outputted from the OFDM decoders A7 and B7 is equal to or smaller than the threshold associated with the received power values and stored in the storage unit (step ST11). When, in step ST11, determining that at least one of the received power values $P_A$ and $P_B$ is equal to or smaller than the above-mentioned threshold, the antenna combination determination processing unit 14 determines that the digital broadcasting receiving apparatus can perform switching of the antennas (step ST12). In contrast, when, in step ST11, determining that both of the received power values $P_A$ and $P_B$ are larger than the above-mentioned threshold, the antenna combination determination processing unit 14 determines that the digital broadcasting receiving apparatus cannot perform switching of the antennas (step ST13).

FIG. 7-2 is a flow chart in a case in which the antenna combination determination processing unit uses $CN_A$ and $CN_B$ as a criterion by which to determine whether or not to perform switching of the antennas. The antenna combination determination processing unit 14 determines whether or not at least one of $CN_A$ and $CN_B$ respectively outputted from the OFDM decoders A7 and B7 is equal to or smaller than the threshold associated with the CN values and stored in the storage unit (step ST21). When, in step ST21, determining that at least one of $CN_A$ and $CN_B$ is equal to or smaller than the above-mentioned threshold, the antenna combination determination processing unit 14 determines that the digital broadcasting receiving apparatus can perform switching of the antennas (step ST22). In contrast, when, in step ST21, determining that both of $CN_A$ and $CN_B$ are larger than the above-mentioned threshold, the antenna combination determination processing unit 14 determines that the digital broadcasting receiving apparatus cannot perform switching of the antennas (step ST23).

FIG. 7-3 is a flow chart in a case in which the antenna combination determination processing unit uses the error rate Ec as a criterion by which to determine whether or not to perform switching of the antennas. The antenna combination determination processing unit 14 determines whether or not the error rate Ec outputted from the error correcting unit 11 is equal to or higher than the threshold associated with the error rate and stored in the storage unit (step ST31). When, in step ST31, determining that the error rate Ec is equal to or higher than the above-mentioned threshold, the antenna combination determination processing unit 14 determines that the digital broadcasting receiving apparatus can perform switching of the antennas (step ST32). In contrast, when, in step ST31, determining that the error rate Ec is lower than the above-mentioned threshold, the antenna combination determination processing unit 14 determines that the digital broadcasting receiving apparatus cannot perform switching of the antennas (step ST33).

FIG. 7-4 is a flow chart in a case in which the antenna combination determination processing unit uses whether the predetermined time interval has elapsed as a criterion by which to determine whether or not to perform switching of the antennas. The antenna combination determination processing unit 14 determines whether the timer has counted up to the predetermined time interval (step ST41). When, in step ST41, determining that the timer has counted up to the predetermined time interval, the antenna combination determination processing unit 14 determines that the digital broadcasting receiving apparatus can perform switching of the antennas (step ST42). In contrast, when, in step ST41, determining that the timer has not counted up to the predetermined time interval yet, the antenna combination determination processing unit 14 decrements the count of the timer by 1 (step ST43) and then determines that that the digital broadcasting receiving apparatus cannot perform switching of the antennas (step ST44).

FIG. 7-5 is a flow chart in a case in which the antenna combination determination processing unit uses the delay profiles $t_A$ and $t_B$ as a criterion by which to determine whether or not to perform switching of the antennas. The antenna combination determination processing unit 14 determines if all of the following conditions are simultaneously satisfied: whether or not the time delay TA or the time delay TB included in at least one of the delay profile $t_A$ outputted from the OFDM decoder A7 and the delay profile $t_B$ outputted from the OFDM decoder B7 is equal to or longer than the threshold associated with the time delays and stored in the storage unit, and whether or not the received power difference $DU_A$ or $DU_B$ is equal to or smaller than the threshold associated with the received power differences and stored in the storage unit (step ST51). When, in step ST51, determining that the time delay TA or the time delay TB included in at least one of the delay profile $t_A$ and the delay profile $t_B$ is equal to or longer than the above-mentioned threshold associated with the time delays, and the received power difference $DU_A$ or $DU_B$ is equal to or smaller than the above-mentioned threshold associated with the received power differences, the antenna combination determination processing unit 14 determines that the digital broadcasting receiving apparatus can perform switching of the antennas (step ST52). In contrast, when, in step ST51, determining that all of the following conditions are not simultaneously satisfied: whether or not the time delay TA or the time delay TB included in at least one of the delay profile $t_A$ outputted from the OFDM decoder A7 and the delay profile $t_B$ outputted from the OFDM decoder B7 is equal to or longer than the threshold associated with the time delays and stored in the storage unit, and whether or not the received power difference $DU_A$ or $DU_B$ is equal to or smaller than the threshold associated with the received power differences and stored in the storage unit, the antenna combination determination processing unit 14 determines that the digital broadcasting receiving apparatus cannot perform switching of the antennas (step ST53).

FIG. 7-6 is a flow chart in a case in which the antenna combination determination processing unit uses whether the digital broadcasting receiving apparatus is searching for a digital broadcasting wave or performing a channel selecting process as a criterion by which to determine whether or not to perform switching of the antennas. The antenna combination determination processing unit 14 determines whether the digital broadcasting receiving apparatus is searching for a digital broadcasting wave or performing a channel selecting process by using a signal outputted from the control unit 15 (step ST61). When, in step ST61, determining that the digital broadcasting receiving apparatus is neither searching for a digital broadcasting wave nor performing a channel selecting process, the antenna combination determination processing unit 14 determines that the digital broadcasting receiving apparatus can perform switching of the antennas (step ST62). In contrast, when, in step ST21, determining that the digital broadcasting receiving apparatus is searching for a digital broadcasting wave or performing a channel selecting process, the antenna combination determination processing unit 14 determines that the digital broadcasting receiving apparatus cannot perform switching of the antennas (step ST63).

FIG. 7-7 is a flow chart in a case in which the antenna combination determination processing unit uses both a value $P_A \times CN_A$ which is the multiplication of the received power value $P_A$ and the C/N value $CN_A$ and a value $P_B \times CN_B$ which is the multiplication of the received power value $P_B$ and the C/N value $CN_B$ as a criterion by which to determine whether or not to perform switching of the antennas. After calculating $P_A \times CN_A$ and $P_B \times CN_B$, the antenna combination determination processing unit 14 determines whether at least one of $P_A \times CN_A$ and $P_B \times CN_B$ is equal to or smaller than the threshold stored in the storage unit (step ST71). When, in step ST71, determining that at least one of the CN values $CN_A$ and $CN_B$ is equal to or smaller than the above-mentioned threshold, the antenna combination determination processing unit 14 determines that the digital broadcasting receiving apparatus can perform switching of the antennas (step ST72). In contrast, when, in step ST71, determining that both of $P_A \times CN_A$ and $P_B \times CN_B$ are larger than the above-mentioned threshold, the antenna combination determination processing unit 14 determines that the digital broadcasting receiving apparatus cannot perform switching of the antennas (step ST73).

Figures 7, 8:
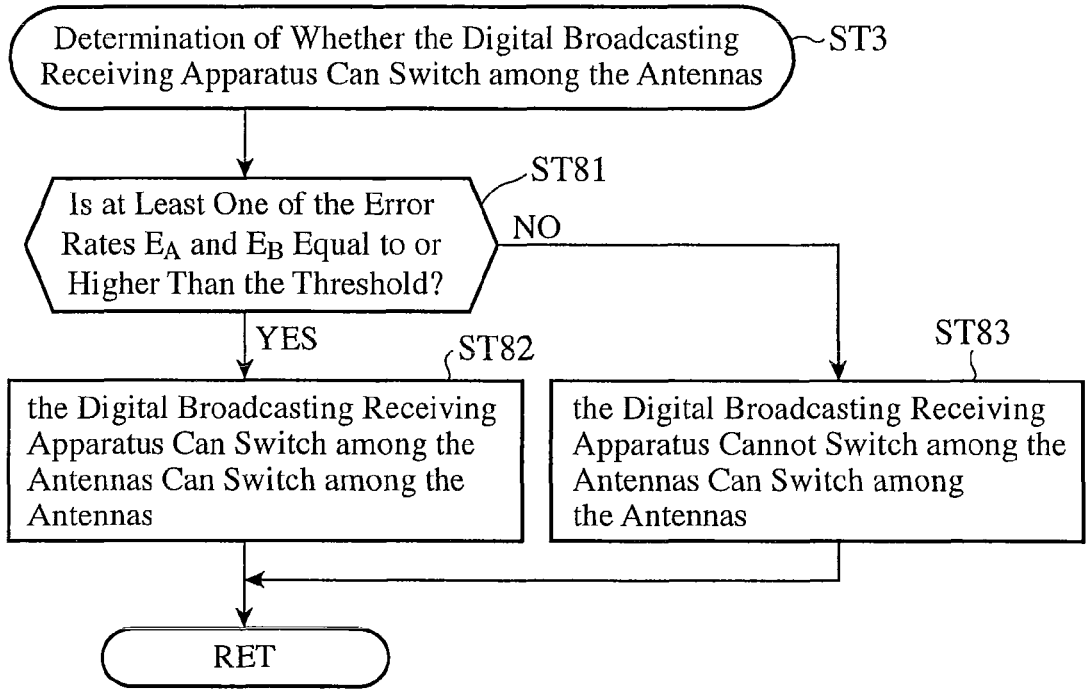

FIG. 7-8 is a flow chart in a case in which the antenna combination determination processing unit uses the error rates $E_A$ and $E_B$ as a criterion by which to determine whether or not to perform switching of the antennas. The antenna combination determination processing unit 14 determines whether or not at least one of the error rate $E_A$ outputted from the error detecting unit A8 and the error rate $E_B$ outputted from the error detecting unit B8 is equal to or higher than the threshold associated with the error rate $E_A$ or $E_B$ and stored in the storage unit (step ST81). When, in step ST81, determining that at least one of the error rates $E_A$ and $E_B$ is equal to or higher than the above-mentioned threshold, the antenna combination determination processing unit 14 determines that the digital broadcasting receiving apparatus can perform switching of the antennas (step ST82). In contrast, when, in step ST81, determining that both of the error rates $E_A$ and $E_B$ are lower than the above-mentioned threshold, the antenna combination determination processing unit 14 determines that the digital broadcasting receiving apparatus cannot perform switching of the antennas (step ST83).

Figures 7, 8, 9:
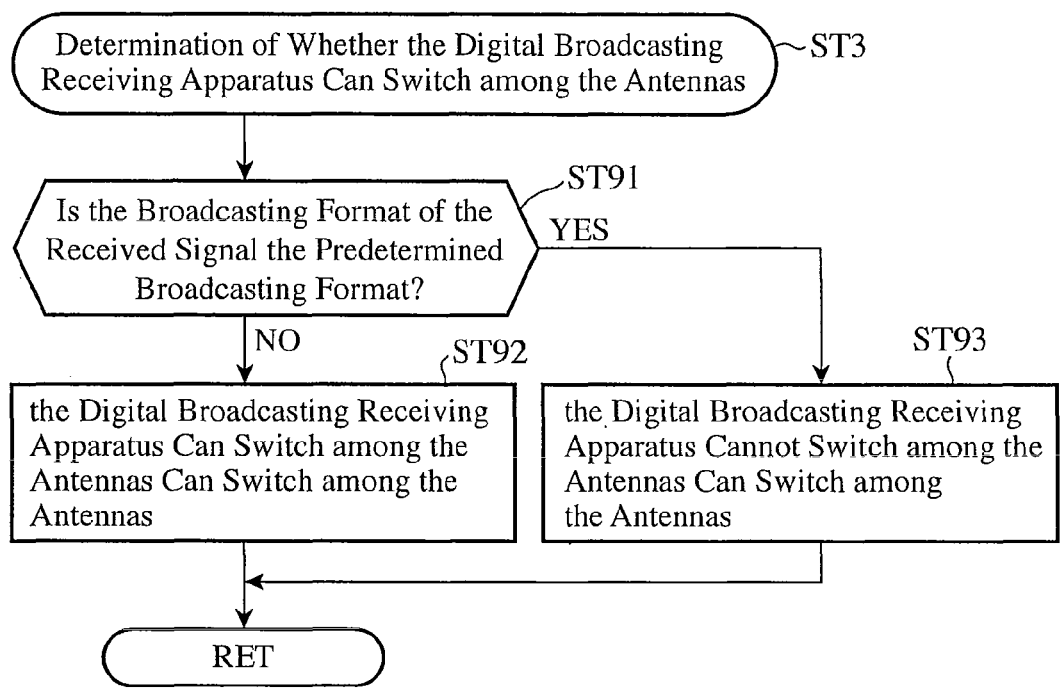
Figures 1, 8:
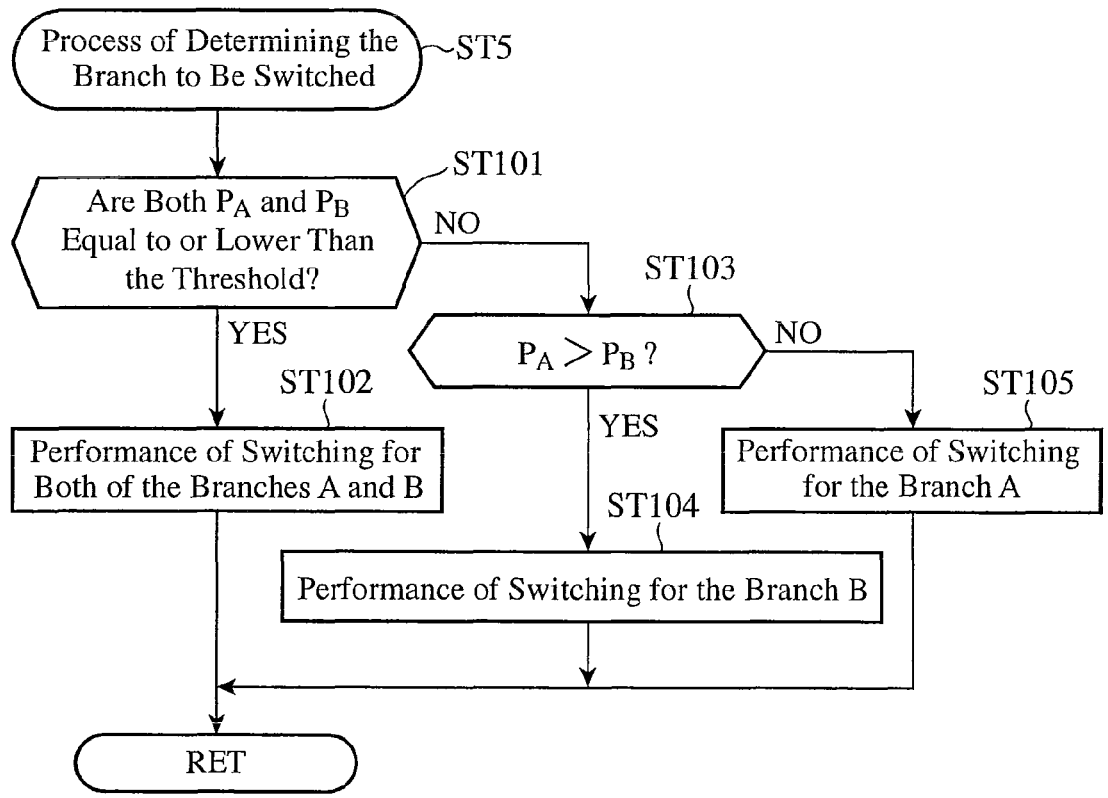
Figures 2, 8:
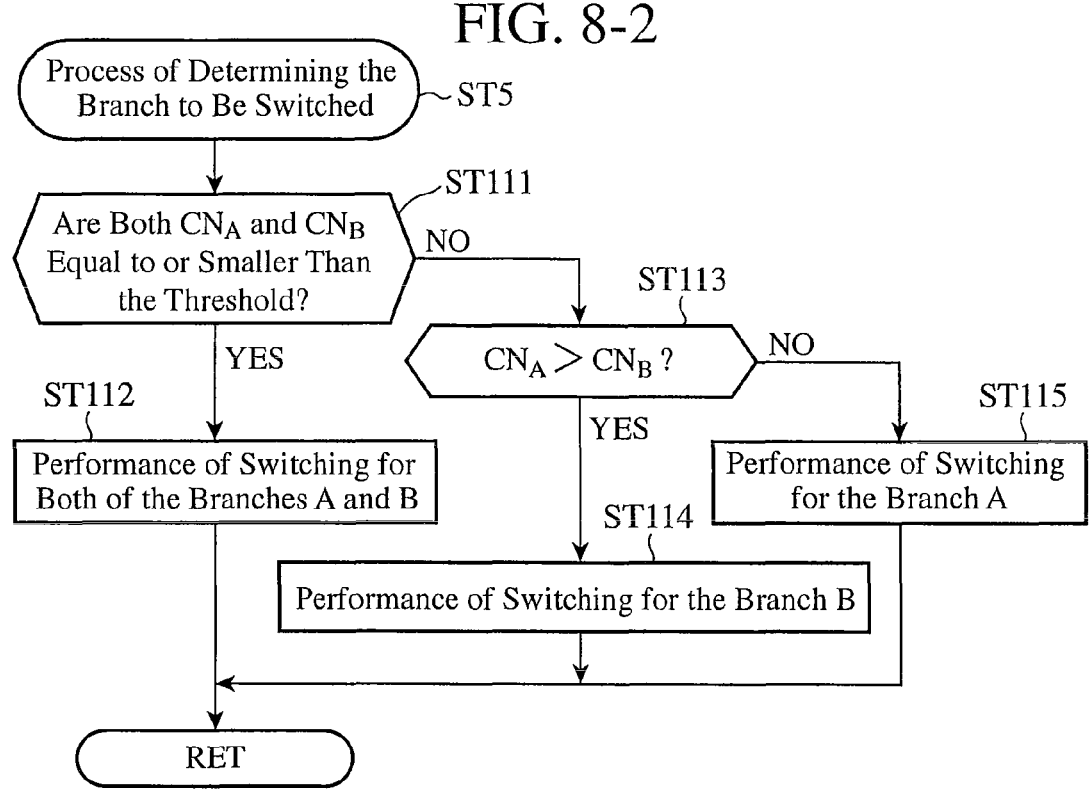
Figures 3, 8:
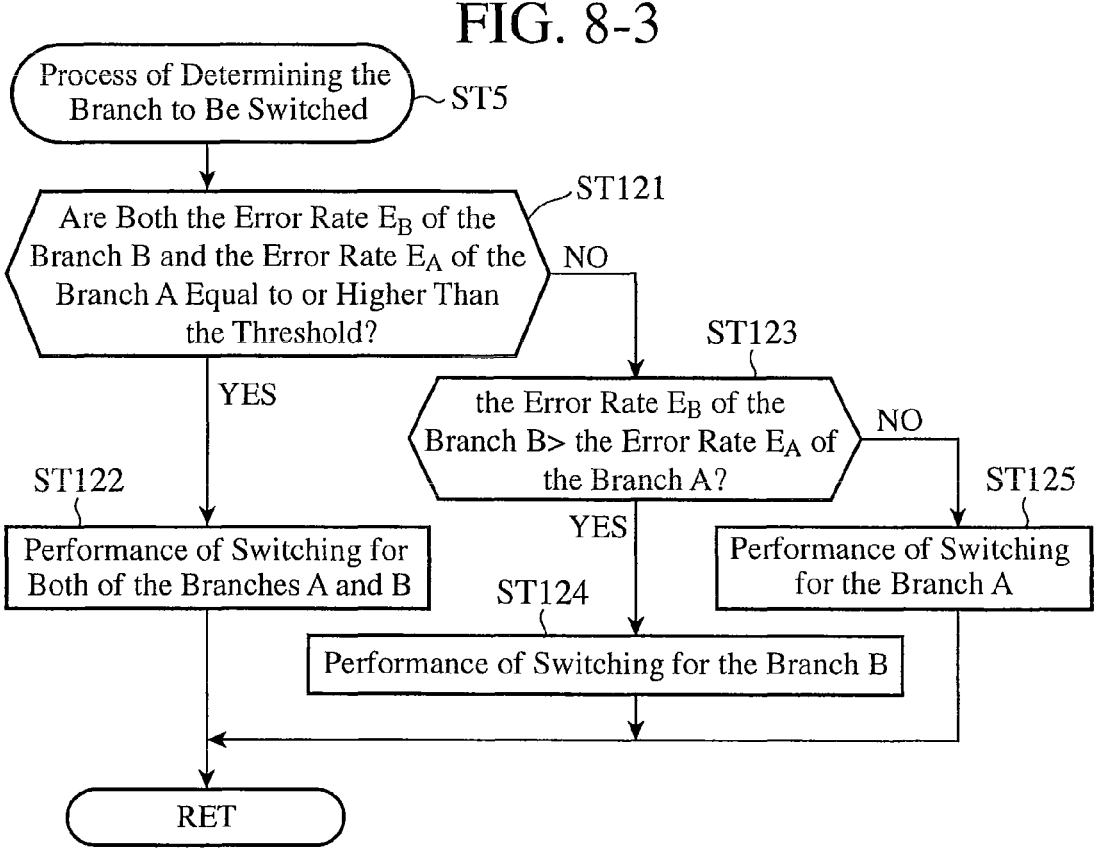
Figures 4, 8:
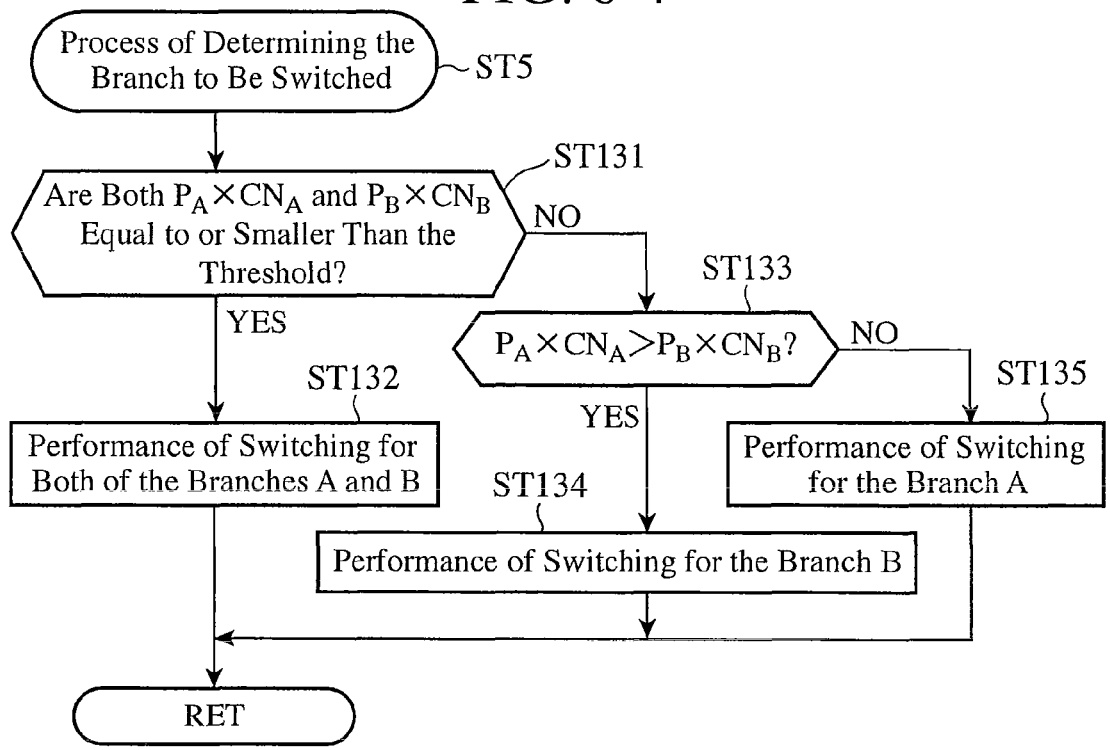
Figures 5, 8:
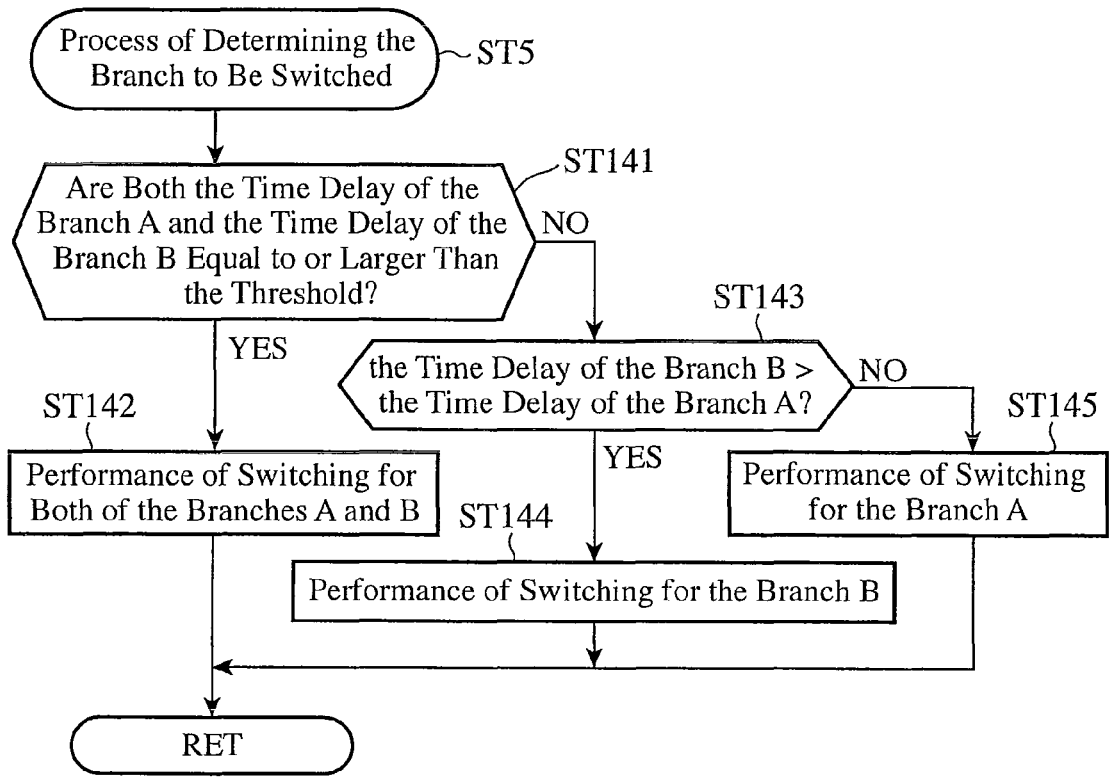
Figures 6, 8:
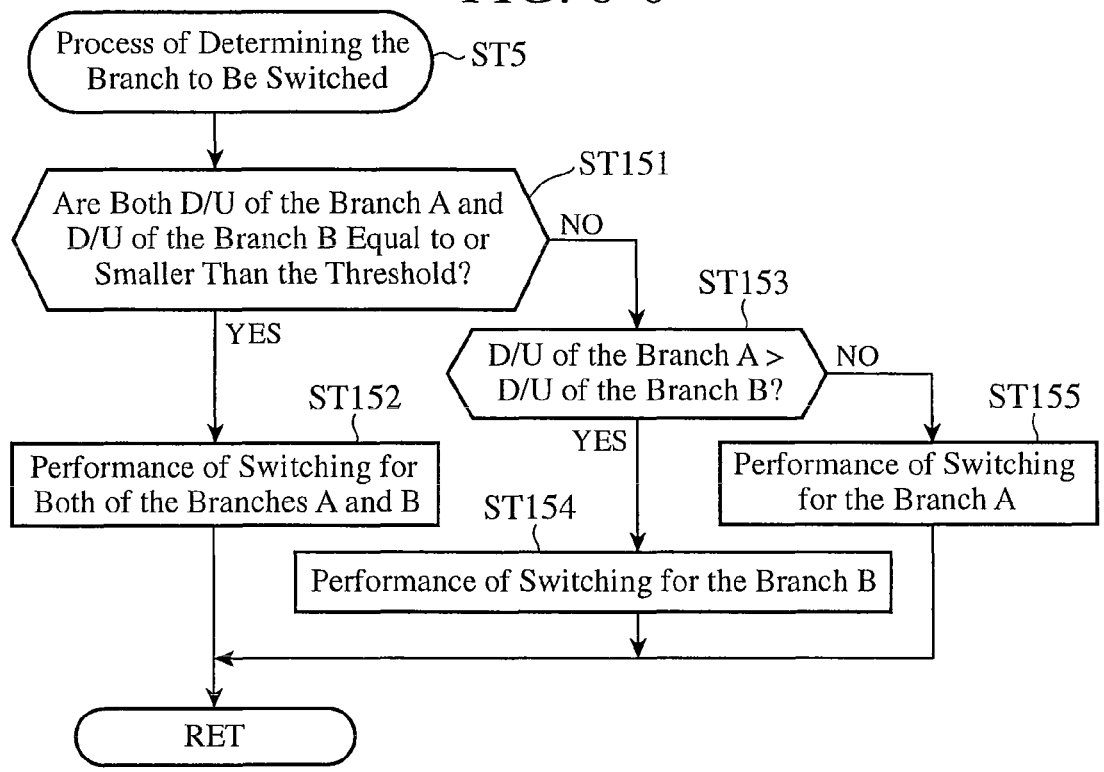
Figures 7, 8:
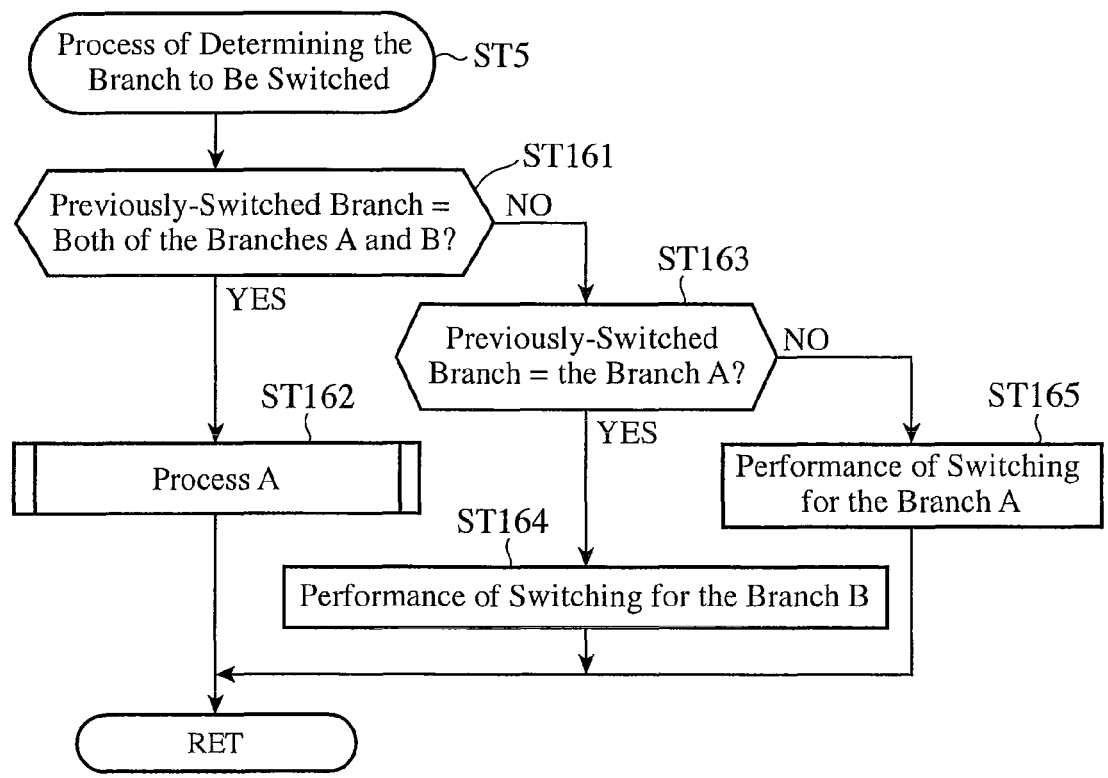
Figure 8:
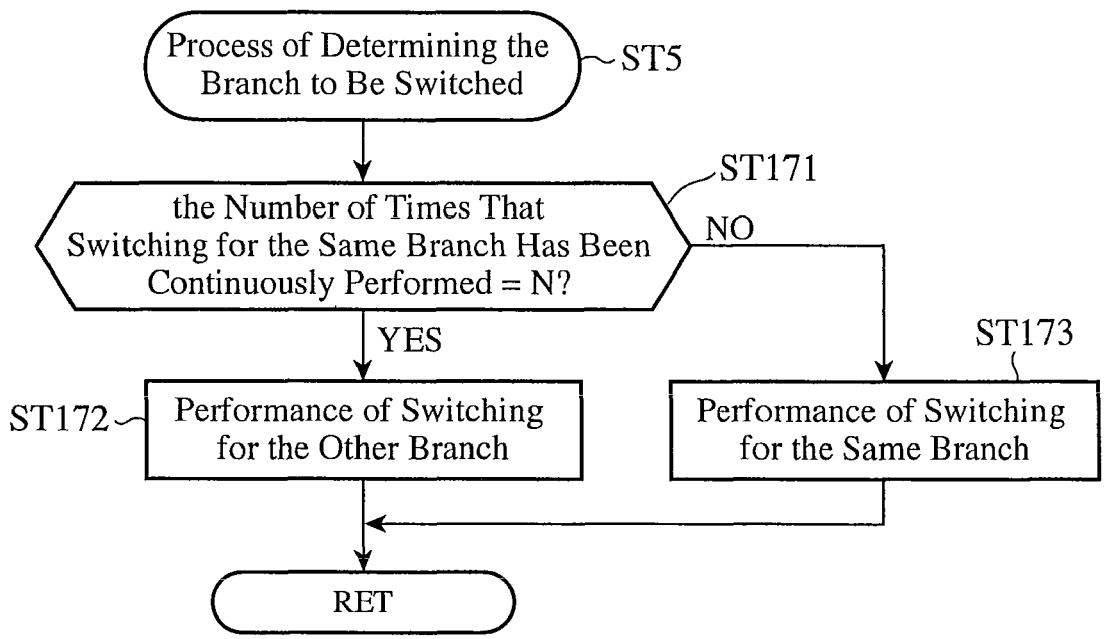
Figures 8, 9:
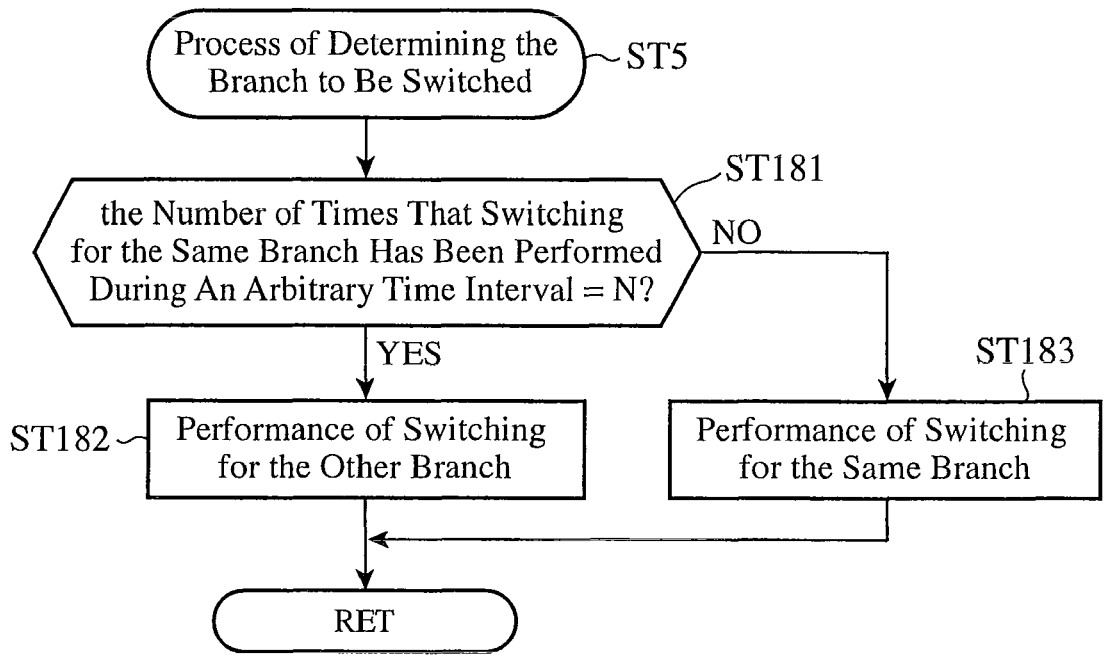
Figure 9:
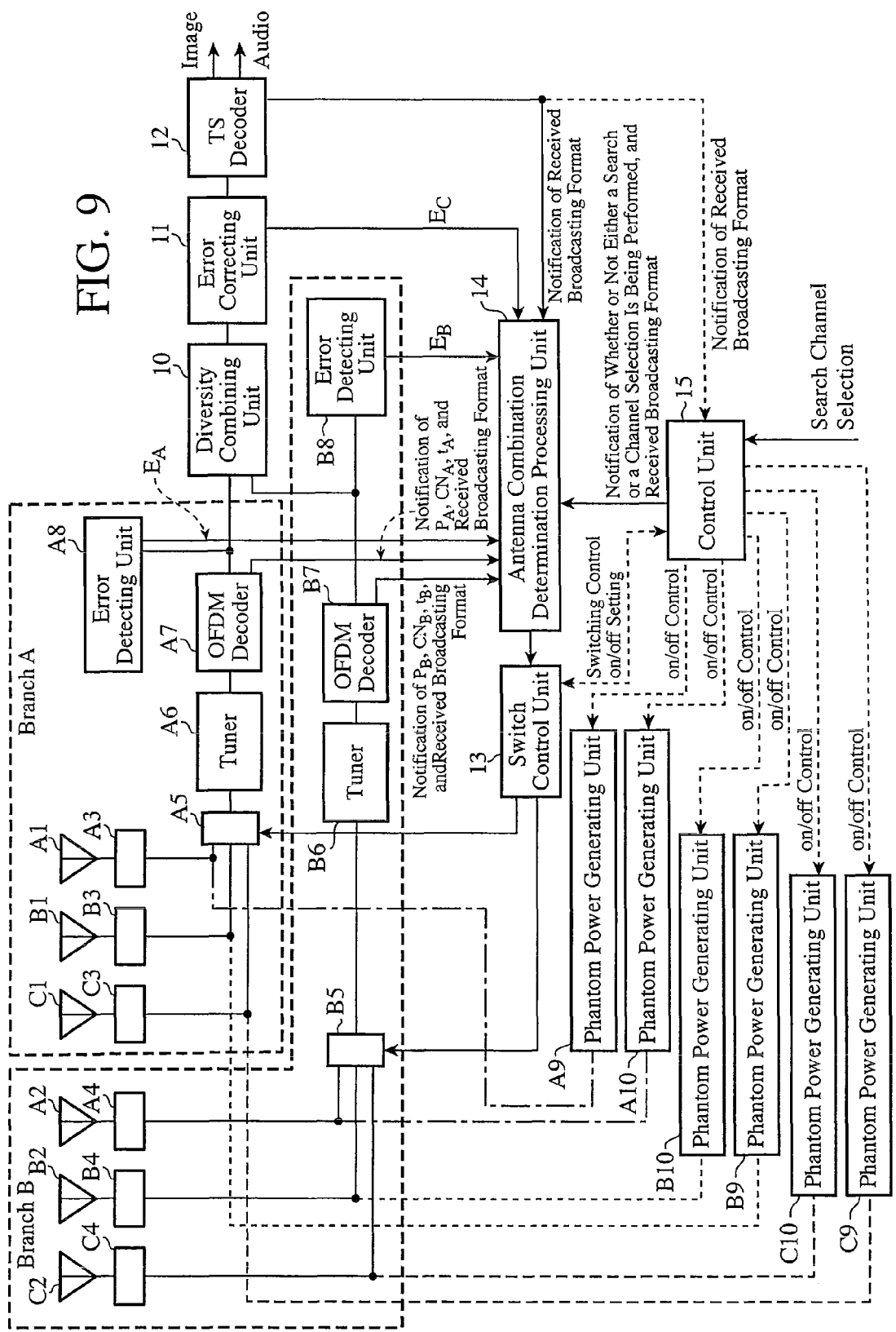

FIG. 7-9 is a flow chart in a case in which the antenna combination determination processing unit uses the broadcasting format as a criterion by which to determine whether or not to perform switching of the antennas. The antenna combination determination processing unit 14 determines whether or not the broadcasting format of the received digital broadcasting wave matches the predetermined broadcasting format shown by the information stored in the storage unit (step ST91). When, in step ST91, determining that the broadcasting format of the received digital broadcasting wave does not match the predetermined broadcasting format information, the antenna combination determination processing unit 14 determines that the digital broadcasting receiving apparatus can perform switching of the antennas (step ST92). In contrast, when, in step ST91, determining that the broadcasting format of the received digital broadcasting wave matches the predetermined broadcasting format, the antenna combination determination processing unit 14 determines that the digital broadcasting receiving apparatus cannot perform switching of the antennas (step ST93). For example, the predetermined broadcasting format is the broadcasting format of one-segment broadcasting in which it cannot be expected that even switching of the antennas obtains any improvement in the reception state, or the like.

Either one of the determinations as shown in FIGS. 7-1 to 7-9 can be carried out exclusively, or the determination processing can be carried out by combining two or more of the processes as shown in FIGS. 7-1 to 7-9 by using an AND gate or the like. As an alternative, the antenna combination determination processing unit can carry out the determination processing by using the received power values, the CN values, and the time delays of the delayed waves with respect to the principal waves, which are respectively outputted from the OFDM decoders A7 and B7, and using error numbers, instead of the error rates, and the reciprocals of the received power differences, instead of the received power differences, and, after multiplying all the above-mentioned values to produce a single value, and comparing this value with a predetermined threshold.

FIG. 8 is a flow chart showing the process of step ST5 of FIG. 6. FIG. 8-1 is a flow chart in a case in which the antenna combination determination processing unit uses the received power values $P_A$ and $P_B$ to perform a process of determining whether or not to switch between the antennas. The antenna combination determination processing unit 14 determines whether or not both the received power values $P_A$ and $P_B$ are equal to or smaller than the threshold associated with the received power values and stored in the storage unit (step ST101). When, in step ST101, determining that both the received power values $P_A$ and $P_B$ are equal to or smaller than the above-mentioned threshold, the antenna combination determination processing unit 14 instructs each of the switches A5 and B5 to switch between the antennas, so that each of the switches A5 and B5 switches between the antennas (step ST102).

In contrast, when, in step ST101, determining that at least one of the received power values $P_A$ and $P_B$ is not equal to or smaller than the above-mentioned threshold, the antenna combination determination processing unit 14 determines whether or not the received power value $P_A$ is larger than the received power value $P_B$ (step ST103). When, in step ST103, determining that the received power value $P_A$ is larger than the received power value $P_B$, the antenna combination determination processing unit 14 instructs the switch B5 to switch between the antennas, so that the switch B5 switches between the antennas (step ST104). In contrast, when, in step ST103, determining that the received power value $P_A$ is equal to or smaller than the received power value $P_B$, the antenna combination determination processing unit 14 instructs the switch A5 to switch between the antennas, so that the switch A5 switches between the antennas (step ST105).

FIG. 8-2 is a flow chart in a case in which the antenna combination determination processing unit uses the CN values $CN_A$ and $CN_B$ to perform the process of determining whether or not to switch between the antennas. The antenna combination determination processing unit 14 determines whether or not both the CN values $CN_A$ and $CN_B$ are equal to or smaller than the threshold associated with the CN values and stored in the storage unit (step ST111). When, in step ST111, determining that both the CN values $CN_A$ and $CN_B$ are equal to or smaller than the above-mentioned threshold, the antenna combination determination processing unit 14 instructs each of the switches A5 and B5 to switch between the antennas, so that each of the switches A5 and B5 switches between the antennas (step ST112). In contrast, when, in step ST111, determining that at least one of the CN values $CN_A$ and $CN_B$ is not equal to or smaller than the above-mentioned threshold, the antenna combination determination processing unit 14 determines whether or not the CN value $CN_A$ is larger than the CN value $CN_B$ (step ST113). When, in step ST113, determining that the CN value $CN_A$ is larger than the CN value $CN_B$, the antenna combination determination processing unit 14 instructs the switch B5 to switch between the antennas, so that the switch B5 switches between the antennas (step ST114). In contrast, when, in step ST113, determining that the CN value $CN_A$ is equal to or smaller than the CN value $CN_B$, the antenna combination determination processing unit 14 instructs the switch A5 to switch between the antennas, so that the switch A5 switches between the antennas (step ST115).

FIG. 8-3 is a flow chart in a case in which the antenna combination determination processing unit uses the error rates $E_A$ and $E_B$ to perform the process of determining whether or not to switch between the antennas. The antenna combination determination processing unit 14 determines whether or not both of the error rates $E_A$ and $E_B$ are equal to or higher than the threshold associated with the error rates and stored in the storage unit (step ST121). When, in step ST121, determining that both of the error rates $E_A$ and $E_B$ are equal to or higher than the above-mentioned threshold, the antenna combination determination processing unit 14 instructs each of the switches A5 and B5 to switch between the antennas, so that each of the switches A5 and B5 switches between the antennas (step ST122). In contrast, when, in step ST121, determining that at least one of the error rates $E_A$ and $E_B$ is not equal to or higher than the above-mentioned threshold, the antenna combination determination processing unit 14 determines whether or not the error rate $E_B$ is higher than the error rate $E_A$ (step ST123). When, in step ST123, determining that the error rate $E_B$ is higher than the error rate $E_A$, the antenna combination determination processing unit 14 instructs the switch B5 to switch between the antennas, so that the switch B5 switches between the antennas (step ST124). In contrast, when, in step ST123, determining that the error rate $E_B$ is equal to or lower than the error rate $E_A$, the antenna combination determination processing unit 14 instructs the switch A5 to switch between the antennas, so that the switch A5 switches between the antennas (step ST125).

FIG. 8-4 is a flow chart in a case in which the antenna combination determination processing unit uses both the value $P_A \times CN_A$ which is the multiplication of the received power value $P_A$ and the C/N value $CN_A$ and the value $P_B \times CN_B$ which is the multiplication of the received power value $P_B$ and the C/N value $CN_B$ to perform the process of determining whether or not to switch between the antennas. The antenna combination determination processing unit 14 determines whether or not both $P_A \times CN_A$ and $P_B \times CN_B$ are equal to or smaller than the corresponding threshold stored in the storage unit (step ST131). When, in step ST131, determining that both $P_A \times CN_A$ and $P_B \times CN_B$ are equal to or smaller than the above-mentioned threshold, the antenna combination determination processing unit 14 instructs each of the switches A5 and B5 to switch between the antennas, so that each of the switches A5 and B5 switches between the antennas (step ST132).

In contrast, when, in step ST131, determining that at least one of $P_A \times CN_A$ and $P_B \times CN_B$ is not equal to or smaller than the above-mentioned threshold, the antenna combination determination processing unit 14 determines whether or not $P_A \times CN_A$ is larger than $P_B \times CN_B$ (step ST133). When, in step ST133, determining that $P_A \times CN_A$ is larger than $P_B \times CN_B$, the antenna combination determination processing unit 14 instructs the switch B5 to switch between the antennas, so that the switch B5 switches between the antennas (step ST134). In contrast, when, in step ST133, determining that $P_A \times CN_A$ is equal to or smaller than $P_B \times CN_B$, the antenna combination determination processing unit 14 instructs the switch A5 to switch between the antennas, so that the switch A5 switches between the antennas (step ST135).

FIG. 8-5 is a flow chart in a case in which the antenna combination determination processing unit uses both the time delay TA included in the delay profile $t_A$ and the time delay TB included in the delay profile $t_B$ to perform the process of determining whether or not to switch between the antennas. The antenna combination determination processing unit 14 determines whether or not both the time delays TA and TB are equal to or longer than the threshold associated with the time delays and stored in the storage unit (step ST141). When, in step ST141, determining that both the time delays TA and TB are equal to or longer than the above-mentioned threshold, the antenna combination determination processing unit 14 instructs each of the switches A5 and B5 to switch between the antennas, so that each of the switches A5 and B5 switches between the antennas (step ST142).

In contrast, when, in step ST141, determining that at least one of the time delays TA and TB is not equal to or longer than the above-mentioned threshold, the antenna combination determination processing unit 14 determines whether or not the time delay TB is longer than the time delay TA (step ST143). When, in step ST143, determining that the time delay TB is longer than the time delay TA, the antenna combination determination processing unit 14 instructs the switch B5 to switch between the antennas, so that the switch B5 switches between the antennas (step ST144). In contrast, when, in step ST143, determining that the time delay TB is equal to or shorter than the time delay TA, the antenna combination determination processing unit 14 instructs the switch A5 to switch between the antennas, so that the switch A5 switches between the antennas (step ST145).

FIG. 8-6 is a flow chart in a case in which the antenna combination determination processing unit uses both the received power difference $DU_A$ included in the delay profile $t_A$ and the received power difference $DU_B$ included in the delay profile $t_B$ to perform the process of determining whether or not to switch between the antennas. The antenna combination determination processing unit 14 determines whether or not both the received power differences $DU_A$ and $DU_B$ are equal to or smaller than the threshold associated with the received power differences and stored in the storage unit (step ST151). When, in step ST151, determining that both the received power differences $DU_A$ and $DU_B$ are equal to or smaller than the above-mentioned threshold, the antenna combination determination processing unit 14 instructs each of the switches A5 and B5 to switch between the antennas, so that each of the switches A5 and B5 switches between the antennas (step ST152).

In contrast, when, in step ST151, determining that at least one of the received power differences $DU_A$ and $DU_B$ is not equal to or smaller than the above-mentioned threshold, the antenna combination determination processing unit 14 determines whether or not the received power difference $DU_A$ is larger than the received power difference $DU_B$ (step ST153). When, in step ST153, determining that the received power difference $DU_A$ is larger than the received power difference $DU_B$, the antenna combination determination processing unit 14 instructs the switch B5 to switch between the antennas, so that the switch B5 switches between the antennas (step ST154). In contrast, when, in step ST153, determining that the received power difference $DU_A$ is equal to or smaller than the received power difference $DU_B$, the antenna combination determination processing unit 14 instructs the switch A5 to switch between the antennas, so that the switch A5 switches between the antennas (step ST155).

FIG. 8-7 is a flow chart in a case in which the antenna combination determination processing unit uses the result of the previous switching to perform the process of determining whether or not to switch between the antennas. The antenna combination determination processing unit 14 determines whether or not the previous switching instruction has been provided for both the switches A5 and B5 (step ST161). When, in step ST161, determining that the previous switching instruction has been provided for both the switches A5 and B5, the antenna combination determination processing unit 14 performs a process A (step ST162). In this case, the processes explained with reference to FIGS. 8-1 to 8-6 are the process A.

In contrast, when, in step ST161, determining that the previous switching instruction has not been provided for at least one of the switches A5 and B5, the antenna combination determination processing unit 14 determines whether or not the previous switching instruction has been provided for the switch A5 (step ST163). When, in step ST163, determining that the previous switching instruction has been provided for the switch A5, the antenna combination determination processing unit 14 instructs the switch B5 to switch between the antennas, so that the switch B5 switches between the antennas (step ST164). In contrast, when, in step ST163, determining that the previous switching instruction has not been provided for the switch A5, the antenna combination determination processing unit 14 instructs the switch A5 to switch between the antennas, so that the switch A5 switches between the antennas (step ST165).

FIG. 8-8 is a flow chart in a case in which the antenna combination determination processing unit performs, in the process of determining whether or not to switch between the antennas, a process of, after continuously performing the switching process of switching between the antennas of the same branch a predetermined number of times, switching between the antennas of the other branch. The antenna combination determination processing unit 14 determines whether the number of times that the antenna combination determination processing unit has performed the switching process on the same branch reaches the predetermined number of times (step ST171). When, in step ST171, determining that the number of times that the antenna combination determination processing unit has performed the switching process on the same branch reaches the predetermined number of times, the antenna combination determination processing unit 14 provides an instruction for switching between the antennas for the other branch (step ST172). In contrast, when, in step ST171, determining that the number of times that the antenna combination determination processing unit has performed the switching process on the same branch does not reach the predetermined number of times, the antenna combination determination processing unit 14 provides an instruction for switching between the antennas for the same branch (step ST173).

More specifically, in the processing shown in FIG. 8-8, when the number of times that the antenna combination determination processing unit has performed the switching process on the antennas of the branch A reaches the predetermined number of times, the antenna combination determination processing unit 14 instructs the switch B5 to switch between the antennas of the branch B, whereas when the number of times that the antenna combination determination processing unit has performed the switching process on the antennas of the branch A does not reach the predetermined number of times, the antenna combination determination processing unit 14 instructs the switch A5 to switch between the antennas of the branch A. Also when the number of times that the antenna combination determination processing unit has performed the switching process on the antennas of the branch B reaches the predetermined number of times, the antenna combination determination processing unit 14 instructs the switch A5 to switch between the antennas of the branch A, whereas when the number of times that the antenna combination determination processing unit has performed the switching process on the antennas of the branch B does not reach the predetermined number of times, the antenna combination determination processing unit 14 instructs the switch B5 to switch between the antennas of the branch B. The number of times that the antenna combination determination processing unit has performed the switching process on the antennas of a branch is stored in a memory built in the antenna combination determination processing unit 14, and, when the number of times that the antenna combination determination processing unit has performed the switching process reaches the predetermined number of times and the branch which is the target for the antenna switching is changed, the number of times that the switching process has been performed on the antennas of the branch which has reached the predetermined number of times is reset.

FIG. 8-9 is a flow chart in a case in which the antenna combination determination processing unit performs, in the process of determining whether or not to switch between the antennas, a process of, after continuously performing the switching process of switching between the antennas of the same branch a predetermined number of times antenna during a predetermined time interval, switching between the antennas of the other branch. The antenna combination determination processing unit 14 determines whether the antenna combination determination processing unit has performed the switching process on the same branch the predetermined number of times during the predetermined time interval (step ST181). When, in step ST181, determining that the antenna combination determination processing unit 14 has performed the switching process on the same branch the predetermined number of times during the predetermined time interval, the antenna combination determination processing unit 14 provides an instruction for switching between the antennas for the switch of the other branch (step ST182). In contrast, when, in step ST181, determining that the antenna combination determination processing unit 14 has not performed the switching process on the same branch the predetermined number of times during the predetermined time interval, the antenna combination determination processing unit 14 provides an instruction for switching between the antennas for the switch of the same branch (step ST183).

Either one of the determinations as shown in FIGS. 8-1 to 8-6 can be carried out exclusively, or the determination processing can be carried out by combining two or more of the processes as shown in FIGS. 8-1 to 8-6 by using an AND gate or the like. As an alternative, the antenna combination determination processing unit can carry out the determination processing by using, as the received power values, the CN values, and the time delays of the delayed waves with respect to the principal waves, detected values, and using error numbers, instead of the error rates, and the reciprocals of the received power differences, instead of the received power differences, and, after multiplying all the above-mentioned values to produce a single value, and comparing this value with a predetermined threshold.

As mentioned above, the digital broadcasting receiving apparatus in accordance with the present Embodiment 1 is constructed in such a way as to include the four antennas each of which receives a digital broadcasting wave, and independently provides an instruction for switching between the antennas connected to each of the branches A and B and having different directivities for each and every of the switches so as to switch between the antennas on the basis of the received power value, the CN value, the error rate, the time delay of the delayed wave with respect to the principal wave, the received power difference, and so on of the received digital broadcasting wave, and then carries out diversity combining. Therefore, the present embodiment offers an advantage of being able to provide a combined directivity in one of various directions with a combination of some of the antennas. Furthermore, because the digital broadcasting receiving apparatus can provide a combined directivity in one of various directions, the present embodiment offers another advantage of being able to improve the receiving capability of the digital broadcasting receiving apparatus even when the difference between the angle of arrival of the principal wave and that of the delayed wave is small. In addition, because the digital broadcasting receiving apparatus does not carry out switching of the antennas unless the predetermined time interval elapses, the present embodiment offers a further advantage of being able to improve the stability of the switching of the antennas.

In addition, the digital broadcasting receiving apparatus in accordance with this Embodiment 1 is provided with two antennas in each of the branches A and B. As an alternative, the digital broadcasting receiving apparatus can be provided with three antennas in one of the branches A and B, and a single antenna in the other branch. This variant which is constructed in this way offers an advantage of being able to decrease the number of antennas of one of the branches, thereby stabilizing the process of determining whether or not to switch among the antennas. In this Embodiment 1, when the broadcasting format of the digital broadcasting wave outputted from the OFDM decoder A7 or B7, the TS decoder 12, or the control unit 15 matches the predetermined broadcasting format shown by the information stored in the storage unit of the antenna combination determination processing unit 14, and when receiving a signal indicating an instruction for instructing a channel selection of a digital broadcasting wave or a search for a digital broadcasting wave, which has been generated through a user's operation, from the control unit 15, the antenna combination determination processing unit 14 does not provide any antenna switching instruction to the switch control unit 13. As an alternative, the control unit 15 can be provided with a storage unit for storing the predetermined broadcasting format information, and can be constructed in such a way as to stop the switch control unit 14 when the broadcasting format of the digital broadcasting wave outputted from the TS decoder 12 matches the predetermined broadcasting format shown by the information stored in the above-mentioned storage unit, and when receiving a signal indicating an instruction for instructing a channel selection of a digital broadcasting wave or a search for a digital broadcasting wave, which has been generated through a user's operation. Furthermore, in a case in which the error rates $E_A$ and $E_B$ of the branches A and B are not used, the error detecting units A8 and B8 can be eliminated.

Embodiment 2

FIG. 9 is a block diagram of a digital broadcasting receiving apparatus in accordance with Embodiment 2. In Embodiment 1, the digital broadcasting receiving apparatus in which the number of antennas in each of the branches A and B thereof is two is explained. In contrast, in this Embodiment 2, the digital broadcasting receiving apparatus in which the number of antennas in each of the branches A and B thereof is three will be explained. The same components as those of Embodiment 1 are designated respectively by the same reference numerals, and the explanation of the components will be omitted hereafter. Each of antennas C1 and C2 receives a digital broadcasting wave transmitted from a broadcasting station, a base station, or the like. Antenna amplifiers C3 and C4 respectively perform gain control on the digital broadcasting waves received by the antennas C1 and C2. A switch A5 switches among the antennas A1, B1, and C1, and a switch B5 switches among the antennas A2, B2, and C2. Phantom power generating units C9 and C10 respectively supply electric power to the antenna amplifiers C3 and C4. Because the operation of the digital broadcasting receiving apparatus in accordance with this embodiment is the same as that of the digital broadcasting receiving apparatus in accordance with Embodiment 1, the explanation of the operation of the digital broadcasting receiving apparatus in accordance with this embodiment will be omitted.

Figure 10:
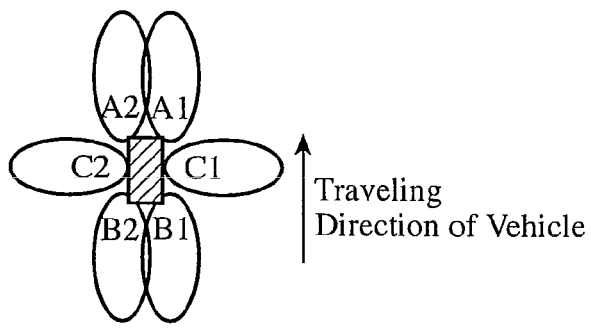
FIG. 10 is a diagram showing an example of the directivities of antennas of the digital broadcasting receiving apparatus in accordance with Embodiment 2.
Figure 10:
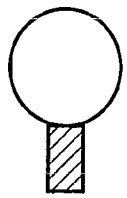
Figure 10:
Figure 10:
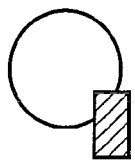
Figure 10:
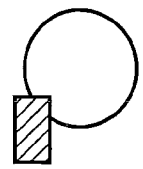
Figure 10:
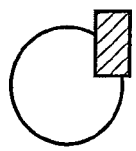
Figure 10:
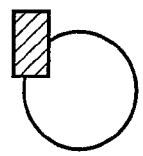
Figure 10:
Figure 10:

FIG. 10(*a*) is a diagram showing an example of the directivity of each antenna of the digital broadcasting receiving apparatus in accordance with Embodiment 2. Each of the antennas A1 and A2 has a directivity in a direction of a front side of a vehicle. Each of the antennas B1 and B2 has a directivity in a direction of a rear side of the vehicle. The antenna C1 has a directivity in a direction of a right-hand side of the vehicle. The antenna C2 has a directivity in a direction of a left-hand side of the vehicle. FIG. 10(*b*) is a diagram showing a combined directivity which is acquired when the antennas A1 and A2 are combined, FIG. 10(*c*) is a diagram showing a combined directivity which is acquired when the antennas B1 and B2 are combined, FIG. 10(*d*) is a diagram showing a combined directivity which is acquired when the antennas A1 and C2 are combined, FIG. 10(*e*) is a diagram showing a combined directivity which is acquired when the antennas A2 and C1 are combined, FIG. 10(*f*) is a diagram showing a combined directivity which is acquired when the antennas B1 and C2 are combined, FIG. 10(*g*) is a diagram showing a combined directivity which is acquired when the antennas B2 and C1 are combined, FIG. 10(*h*) is a diagram showing a combined directivity which is acquired when the antennas A1 and B2 or A2 and B1 are combined, and FIG. 10(*i*) is a diagram showing a combined directivity which is acquired when the antennas C1 and C2 are combined.

As mentioned above, in the digital broadcasting receiving apparatus in accordance with Embodiment 2, the number of antennas in each of the branches A and B is three. Therefore, the present embodiment offers an advantage of being able to increase the number of combinations of antennas as compared with Embodiment 1, thereby increasing the number of variations of the combined directivity. Furthermore, because the digital broadcasting receiving apparatus provides a larger number of variations of the combined directivity, the present embodiment offers another advantage of being able to support a larger number of reception states as compared with Embodiment 1. In addition, the present embodiment offers further advantages which are the same as those provided by Embodiment 1. Furthermore, the digital broadcasting receiving apparatus in accordance with this Embodiment 2 can be alternatively provided with four antennas in one of the branches A and B, and two antennas in the other branch, or can be provided with five antennas in one of the branches A and B, and a single antenna in the other branch, like that in accordance with this Embodiment 1. This variant which is constructed in this way offers an advantage of being able to decrease the number of antennas of one of the branches, thereby stabilizing the process of determining whether or not to switch among the antennas.

Embodiment 3

Figure 11:
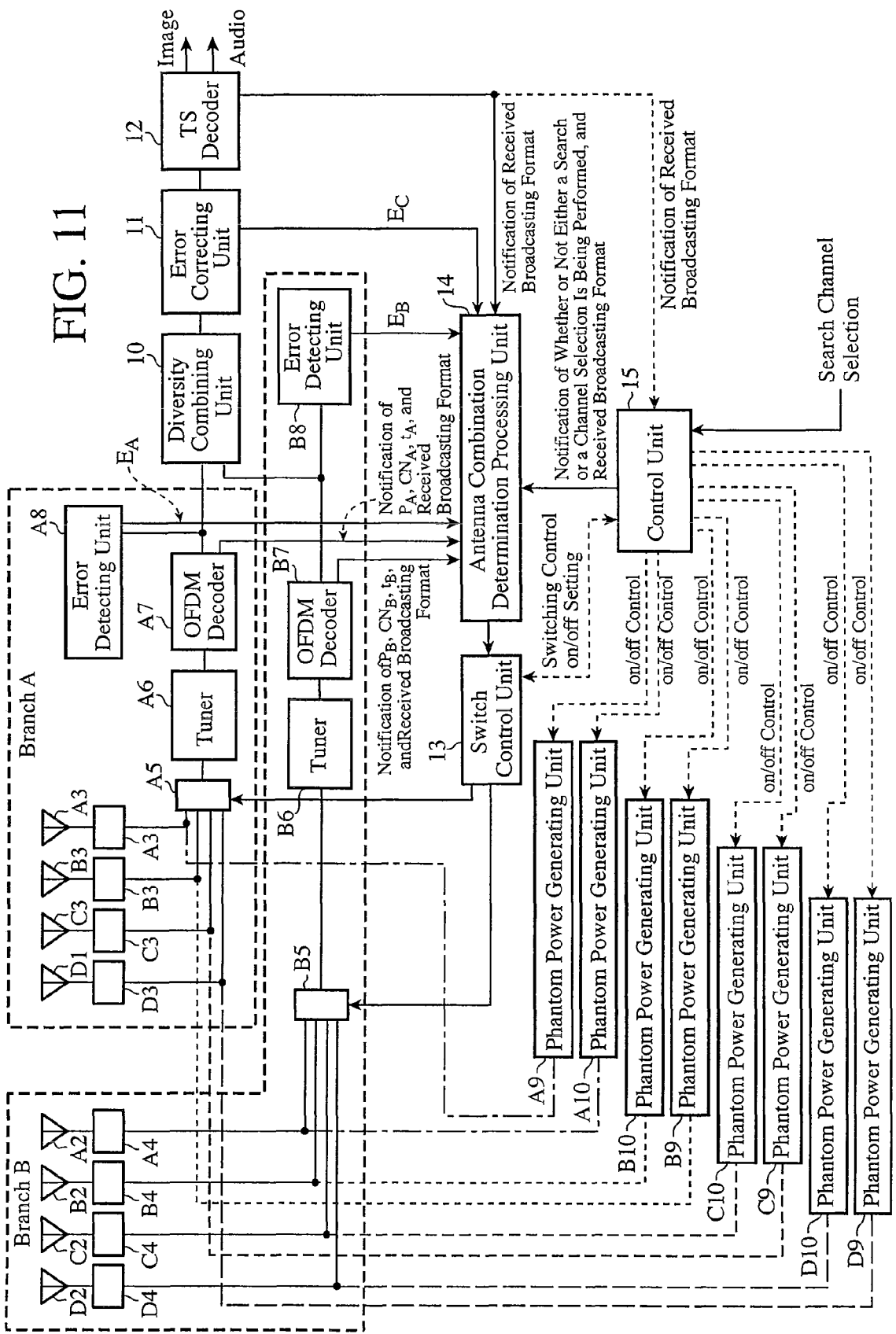
FIG. 11 is a block diagram of a digital broadcasting receiving apparatus in accordance with Embodiment 3.

FIG. 11 is a block diagram of a digital broadcasting receiving apparatus in accordance with Embodiment 3. In Embodiment 2, the digital broadcasting receiving apparatus in which the number of antennas in each of the branches A and B thereof is three is explained. In contrast, in this Embodiment 3, the digital broadcasting receiving apparatus in which the number of antennas in each of the branches A and B thereof is four will be explained. The same components as those of Embodiments 1 and 2 are designated respectively by the same reference numerals, and the explanation of the components will be omitted hereafter. Each of antennas D1 and D2 receives a digital broadcasting wave transmitted from a broadcasting station, a base station, or the like. Antenna amplifiers D3 and D4 respectively perform gain control on the digital broadcasting waves received by the antennas D1 and D2. A switch A5 switches among the antennas A1, B1, C1, and D1, and a switch B5 switches among the antennas A2, B2, C2, and D2. Phantom power generating units C9 and C10 respectively supply electric power to the antenna amplifiers C3 and C4. Because the operation of the digital broadcasting receiving apparatus in accordance with this embodiment is the same as that of the digital broadcasting receiving apparatus in accordance with Embodiment 1, the explanation of the operation of the digital broadcasting receiving apparatus in accordance with this embodiment will be omitted.

Figure 12:
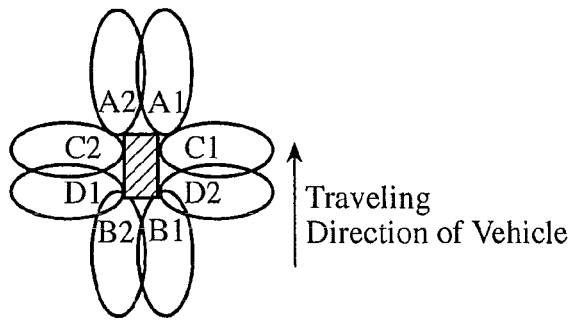
FIG. 12 is a diagram showing an example of the directivities of antennas of the digital broadcasting receiving apparatus in accordance with Embodiment 3.
Figure 12:
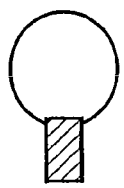
Figure 12:
Figure 12:
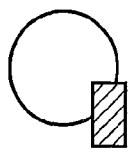
Figure 12:
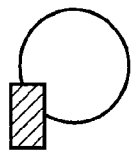
Figure 12:
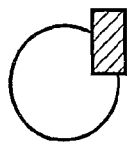
Figure 12:
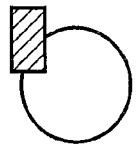
Figure 12:
Figure 12:
Figure 12:
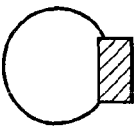
Figure 12:
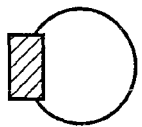

FIG. 12(a) is a diagram showing an example of the directivity of each antenna of the digital broadcasting receiving apparatus in accordance with Embodiment 3. Each of the antennas A1 and A2 has a directivity in a direction of a front side of a vehicle. Each of the antennas B1 and B2 has a directivity in a direction of a rear side of the vehicle. Each of the antennas C1 and D2 has a directivity in a direction of a right-hand side of the vehicle. Each of the antennas C2 and D1 has a directivity in a direction of a left-hand side of the vehicle. FIG. 12(b) is a diagram showing a combined directivity which is acquired when the antennas A1 and A2 are combined, FIG. 12(c) is a diagram showing a combined directivity which is acquired when the antennas B1 and B2 are combined, FIG. 12(d) is a diagram showing a combined directivity which is acquired when the antennas A1 and C2, or A2 and D1 are combined, FIG. 12(e) is a diagram showing a combined directivity which is acquired when the antennas A2 and C1, or A1 and D2 are combined, FIG. 12(f) is a diagram showing a combined directivity which is acquired when the antennas B1 and C2, or B2 and D1 are combined, FIG. 12(g) is a diagram showing a combined directivity which is acquired when the antennas B1 and D2, or B2 and C1 are combined, FIG. 12(h) is a diagram showing a combined directivity which is acquired when the antennas A1 and B2, or A2 and B1 are combined, FIG. 12(i) is a diagram showing a combined directivity which is acquired when the antennas C1 and C2, or D1 and D2 are combined, FIG. 12(j) is a diagram showing a combined directivity which is acquired when the antennas D1 and C2 are combined, and FIG. 12(k) is a diagram showing a combined directivity which is acquired when the antennas C1 and D2 are combined.

As mentioned above, in the digital broadcasting receiving apparatus in accordance with Embodiment 3, the number of antennas in each of the branches A and B is four. Therefore, the present embodiment offers an advantage of being able to increase the number of combinations of antennas as compared with Embodiment 2, thereby increasing the number of variations of the combined directivity. Furthermore, because the digital broadcasting receiving apparatus provides a larger number of variations of the combined directivity, the present embodiment offers another advantage of being able to support a larger number of reception states as compared with Embodiment 2. In addition, the present embodiment offers further advantages which are the same as those provided by Embodiments 1 and 2. Also in this Embodiment 3, the digital broadcasting receiving apparatus can be alternatively provided with a larger number of antennas in one of the branches A and B, and a smaller number of antennas in the other branch, like that in accordance with Embodiment 1 or 2. This variant which is constructed in this way offers an advantage of being able to decrease the number of antennas of one of the branches, thereby stabilizing the process of determining whether or not to switch among the antennas.

Embodiment 4

The digital broadcasting receiving apparatus in accordance with any one of Embodiments 1 to 3 does not control the phantom power generating units. Therefore, there may be a case in which depending upon the broadcasting format of a digital broadcasting wave which the digital broadcasting receiving apparatus receives or decodes, any improvement in its receiving capability using the antenna switching cannot be expected, if anything the receiving capability degrades inversely due to the antenna switching. In such a case, the digital broadcasting receiving apparatus should stop the antenna switching, while the digital broadcasting receiving apparatus can reduce its power consumption by stopping the supply of the electric power to the antenna amplifier of any antenna which is not used at this time. To this end, the digital broadcasting receiving apparatus in accordance with Embodiment 4 is provided with a feature of controlling its power consumption by stopping the supply of the electric power to any antenna which is not selected by a switch control unit 13 from a corresponding phantom power generating unit. In this Embodiment 4, a case in which the power consumption of the corresponding phantom power generating unit is controlled in the digital broadcasting receiving apparatus in accordance with Embodiment 3 will be explained. As an alternative, the corresponding phantom power generating unit can be controlled in the digital broadcasting receiving apparatus in accordance with Embodiment 1 or 2.

Next, the operation of the digital broadcasting receiving apparatus will be explained.

Figures 1, 13:
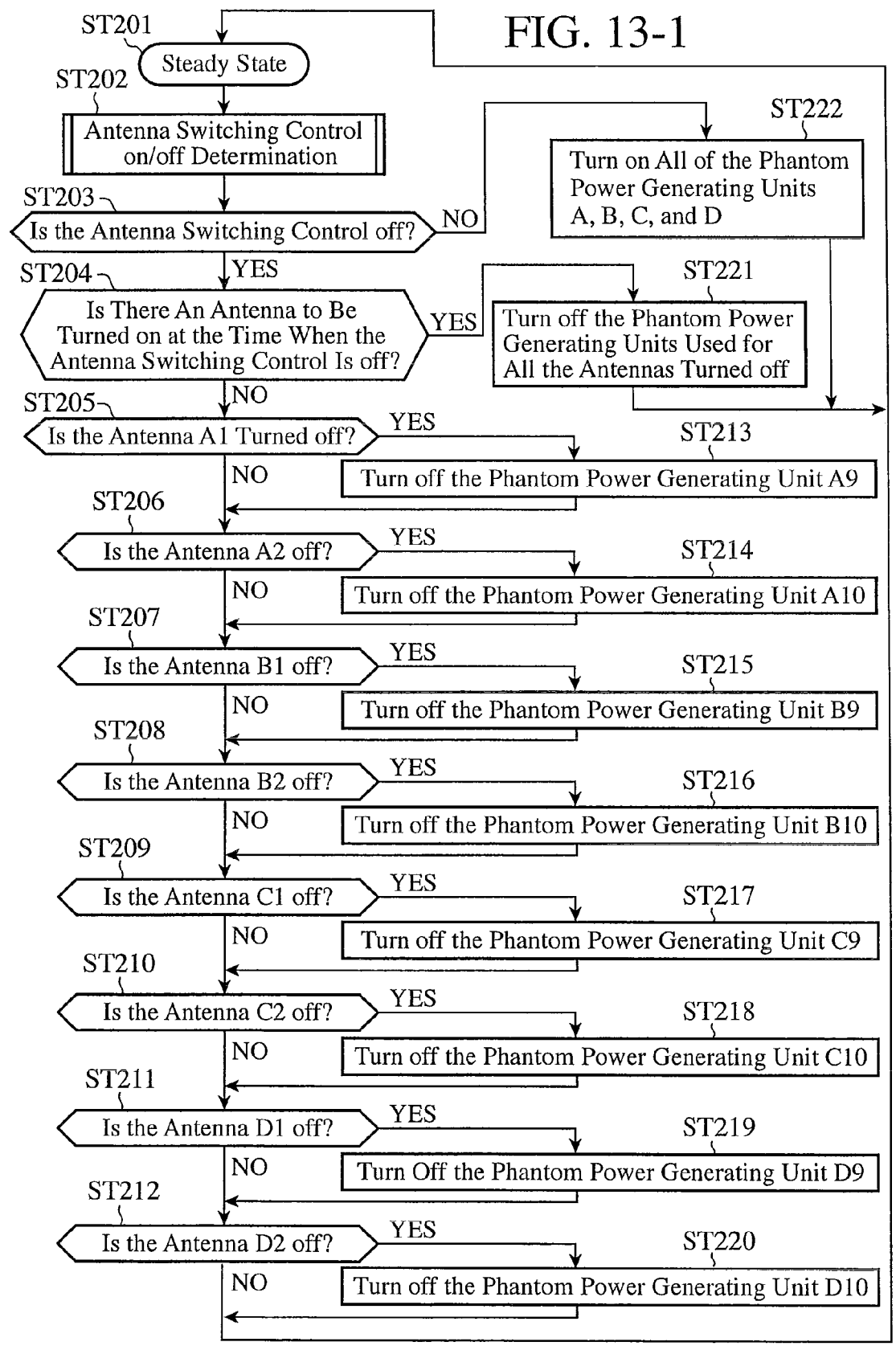
Figures 2, 13:
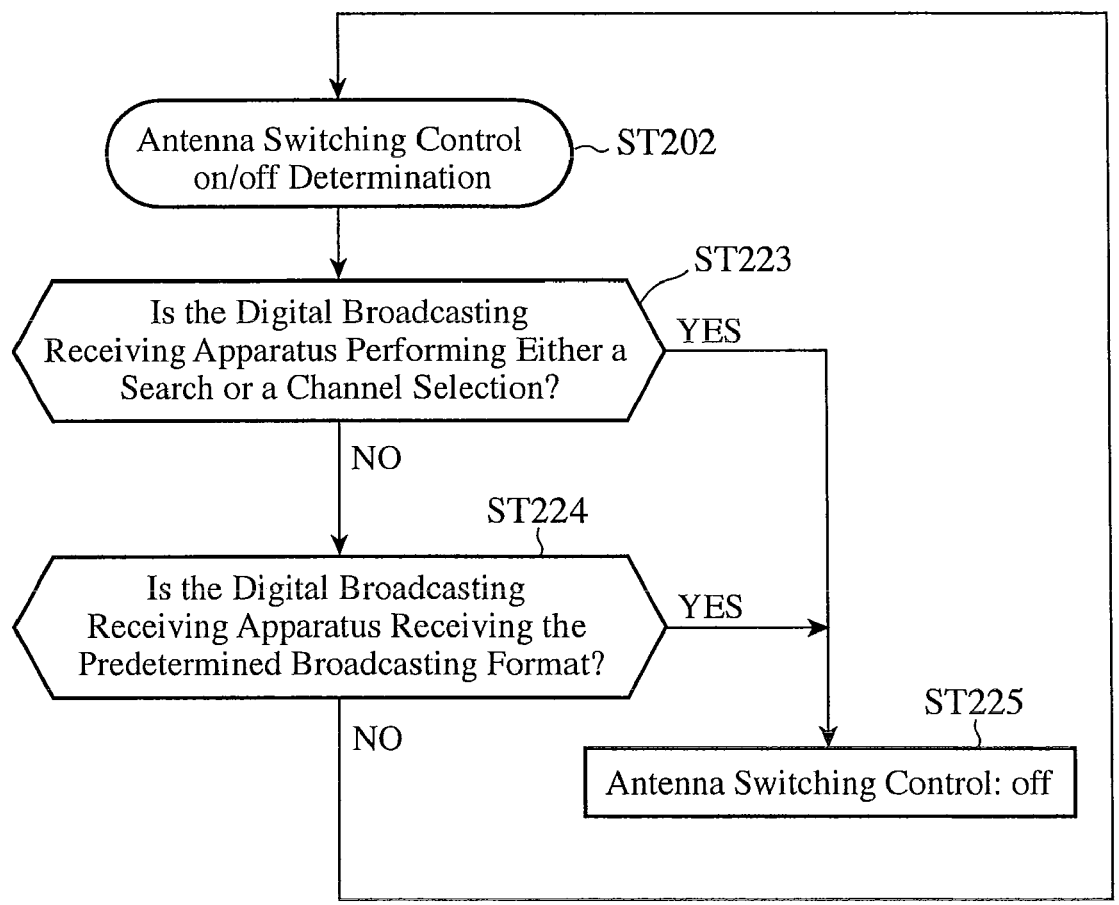

FIGS. 13-1 and 13-2 are flow charts showing the operation of the digital broadcasting receiving apparatus in accordance with this Embodiment 4. Hereafter, only the feature of the digital broadcasting receiving apparatus in accordance with this Embodiment 4 will be explained.

In a steady state (step ST201), a control unit 15 performs a process of determining whether or not to perform antenna switching control (step ST202). The process of this step ST202 will be mentioned below with reference to FIG. 13-2. The control unit 15 then determines whether or not the antenna switching control is in its off state from the result of the process of step ST202 (step ST203).

When, in step ST203, determining that the antenna switching control is not in its off state, the control unit 15 turns on all phantom power generating units A9, B9, C9, D9, A10, B10, C10, and D10 (step ST222). In contrast, when, in step ST203, determining that the antenna switching control is in its off state, the control unit 15 checks whether or not one or more antennas to each of which the electric power is to be supplied when the antenna control is in its off state are predetermined (step ST204). When, in step ST204, one or more antennas to each of which the electric power is to be supplied when the antenna control is in its off state are predetermined, the control unit stops the supply of the electric power to any antenna other than the one or more antennas to each of which the electric power is to be supplied (step ST221).

In contrast, when, in step ST204, no antennas to each of which the electric power is to be supplied are predetermined, the control unit 15 refers to the switch control unit 13 and then determines whether or not the antenna A1 is in its off state, i.e. whether or not the antenna A1 is selected (step ST205). When, in step ST205, determining that the antenna A1 is in its off state, the control unit 15 turns off the phantom power generating unit A9 to reduce the power consumption of the digital broadcasting receiving apparatus (step ST213). The control unit 15 then refers to the switch control unit 13 and then determines whether or not the antenna A2 is in its off state (step ST206). When, in step ST206, determining that the antenna A2 is in its off state, the control unit 15 turns off the phantom power generating unit A10 to reduce the power consumption of the digital broadcasting receiving apparatus (step ST214).

The control unit 15 then refers to the switch control unit 13 and then determines whether or not the antenna B1 is in its off state (step ST207). When, in step ST207, determining that the antenna B1 is in its off state, the control unit 15 turns off the phantom power generating unit B9 to reduce the power consumption of the digital broadcasting receiving apparatus (step ST215). The control unit 15 then refers to the switch control unit 13 and then determines whether or not the antenna B2 is in its off state (step ST208). When, in step ST208, determining that the antenna B2 is in its off state, the control unit 15 turns off the phantom power generating unit B10 to reduce the power consumption of the digital broadcasting receiving apparatus (step ST216).

The control unit 15 then refers to the switch control unit 13 and then determines whether or not the antenna C1 is in its off state (step ST209). When, in step ST209, determining that the antenna C1 is in its off state, the control unit 15 turns off the phantom power generating unit C9 to reduce the power consumption of the digital broadcasting receiving apparatus (step ST217). The control unit 15 then refers to the switch control unit 13 and then determines whether or not the antenna C2 is in its off state (step ST210). When, in step ST210, determining that the antenna C2 is in its off state, the control unit 15 turns off the phantom power generating unit C10 to reduce the power consumption of the digital broadcasting receiving apparatus (step ST218).

The control unit 15 then refers to the switch control unit 13 and then determines whether or not the antenna D1 is in its off state (step ST211). When, in step ST211, determining that the antenna D1 is in its off state, the control unit 15 turns off the phantom power generating unit D9 to reduce the power consumption of the digital broadcasting receiving apparatus (step ST219). The control unit 15 then refers to the switch control unit 13 and then determines whether or not the antenna D2 is in its off state (step ST212). When, in step ST212, determining that the antenna D2 is in its off state, the control unit 15 turns off the phantom power generating unit D10 to reduce the power consumption of the digital broadcasting receiving apparatus (step ST220).

The control unit can determine whether or not each antenna is in its on state in the determination process of steps ST205 to ST212 of FIG. 13-1, and, when determining that each antenna is in its on state, the control unit can perform the processes of steps ST213 to ST220 in such a way as to turn on the phantom power generating unit associated with the antenna amplifier connected to the antenna on which the control unit has performed the determination process.

Next, the process of step ST202 of FIG. 13-1 will be explained with reference to FIG. 13-2. When starting the process of step ST202, the control unit 15 determines whether or not the digital broadcasting receiving apparatus is making a search or performing a channel selecting process (step ST223). When, in step ST223, determining that the digital broadcasting receiving apparatus is making a search or performing a channel selecting process, the control unit 15 stops the antenna switching operation of the switch control unit 13. In contrast, when, in step ST223, determining that the digital broadcasting receiving apparatus is neither making a search nor performing a channel selecting process, the control unit 15 determines whether or not the broadcasting format is a predetermined broadcasting format, e.g. a one-segment broadcasting format, shown by information stored in advance in a storage unit (step ST224). When, in step ST224, determining that the broadcasting format is the predetermined broadcasting format, e.g. a one-segment broadcasting format, the control unit 15 stops the antenna switching operation of the switch control unit 13 (step ST225). In contrast, when, in step ST224, determining that the broadcasting format is not the predetermined broadcasting format, e.g. a one-segment broadcasting format, the control unit 15 returns to the process of determining whether or not to carry out the antenna switching control of step ST202.

As mentioned above, the digital broadcasting receiving apparatus in accordance with this Embodiment 4 stops a phantom power generating unit on the basis of the process of determining whether or not to carry out the antenna switching control to stop the supply of electric power to the antenna amplifier of an antenna which is not selected by the switch control unit 13. Therefore, the present embodiment offers an advantage of being able to reduce the power consumption of the digital broadcasting receiving apparatus. In this Embodiment 4, a phantom power generating unit is disposed for each and every antenna amplifier. As an alternative, a single phantom electric power is provided for each set of a plurality of antenna amplifiers by, for example, grouping all the antenna amplifiers into the antenna amplifiers A3 and A4, the antenna amplifiers B3 and B4, the antenna amplifiers C3 and C4, and the antenna amplifiers D3 and D4, and providing a single phantom electric power for each and every amplifier group as mentioned above.

INDUSTRIAL APPLICABILITY

As mentioned above, because the digital broadcasting receiving apparatus in accordance with the present invention instructs each and every of the switches to switch among a plurality of antennas having directivities in different directions, the digital broadcasting receiving apparatus in accordance with the present invention can provide a combined directivity in one of various directions with a combination of a plurality of antennas, and can therefore improve its receiving capability. Therefore, the digital broadcasting receiving apparatus in accordance with the present invention is suitable for use as a vehicle-mounted digital broadcasting receiving apparatus, or the like.

The invention claimed is:

1. A digital broadcasting receiving apparatus provided with a plurality of antennas which have directivities in different directions and each of which receives a digital broadcasting wave transmitted from outside the digital broadcasting receiving apparatus, said digital broadcasting receiving apparatus selecting at least two antennas from among said plurality of antennas to perform diversity combining, wherein said digital broadcasting receiving apparatus comprises:
a plurality of switches for switching among said plurality of antennas;
an antenna combination determination processing unit for determining switching of said at least two selected antennas on a basis of a state of reception of digital broadcasting waves received by said at least two selected antennas, further wherein if all of delay times included in respective delay profiles of the digital broadcasting waves received by said at least two selected antennas are equal to or longer than a predetermined time, said antenna combination determination processing unit provides an instruction for switching among said plurality of antennas for each and every of said plurality of switches, and if at least one of the delay times included in said respective delay profiles is not equal to or longer than said predetermined time, said antenna combination determination processing unit provides an instruction for switching of the antenna among said plurality of antennas which has the maximum delay time in the delay times included in said respective delay profiles; and a switch control unit for providing an instruction for switching among said plurality of switches according to the instruction from said combination determination processing unit.

2. The digital broadcasting receiving apparatus according to claim 1, wherein said digital broadcasting receiving apparatus includes an OFDM decoder for, after converting an analog signal of said digital broadcasting wave into a digital signal, performing FFT conversion on the digital signal and outputting this converted signal, and for detecting and outputting a received power value and a carrier to noise ratio of said converted signal, and an error correcting unit for making an error correction to said digital broadcasting wave and outputting this error-corrected signal, and for outputting an error rate of said error-corrected signal, and wherein said antenna combination determination processing unit provides the instruction for switching among said plurality of antennas on a basis of the state of reception which is at least one of the received power value and the carrier to noise ratio, which are outputted from said OFDM decoder, and the error rate outputted from said error correcting unit.

3. The digital broadcasting receiving apparatus according to claim 1, wherein said antenna combination determination processing unit is provided with a timer for counting up to a predetermined time interval, and does not provide the instruction for switching among said plurality of antennas while said timer counts the predetermined time interval.

4. The digital broadcasting receiving apparatus according to claim 1, wherein said antenna combination determination processing unit stores a number of times that each and every of said plurality of switches has switched among a plurality of antennas, and, when the number of times that one of said plurality of switches has switched among a plurality of antennas exceeds a predetermined number of times, provides an instruction for making another switch among antennas.

5. The digital broadcasting receiving apparatus according to claim 2, wherein said digital broadcasting receiving apparatus includes:

a plurality of antenna amplifier respectively disposed for said plurality of antennas, each for amplifying the received digital broadcasting wave; a plurality of phantom power supplies for furnishing electric power to said plurality of antenna amplifiers; and a control unit for determining which one of said plurality of antennas has been selected with reference to said switch control unit, and for stopping said phantom power supplies on a basis of a result of said determination.

6. A digital broadcasting receiving apparatus provided with a plurality of antennas which have directivities in different directions and each of which receives a digital broadcasting wave transmitted from outside the digital broadcasting receiving apparatus, said digital broadcasting receiving apparatus selecting at least two antennas from among said plurality of antennas to perform diversity combining, wherein said digital broadcasting receiving apparatus comprises:

a plurality of switches for switching among said plurality of antennas;

an antenna combination determination processing unit for determining switching of said at least two selected antennas on a basis of a state of reception of digital broadcasting waves received by said at least two selected antennas, further wherein if all of received power differences included in delay profiles of the respective digital broadcasting waves received by said at least two selected antennas are equal to or smaller than a predetermined power, said antenna combination determination processing unit provides an instruction for switching among said plurality of antennas for each and every of said plurality of switches, and if at least one of said received power differences is larger than said predetermined power, said antenna combination determination processing unit provides an instruction for switching of the antenna among said plurality of antennas which has the minimum received power difference in the received power differences included in said delay profiles; and a switch control unit for providing an instruction for switching among said plurality of switches according to the instruction from said combination determination processing unit.

7. The digital broadcasting receiving apparatus according to claim 6, wherein said digital broadcasting receiving apparatus includes an OFDM decoder for, after converting an analog signal of said digital broadcasting wave into a digital signal, performing FFT conversion on the digital signal and outputting this converted signal, and for detecting and outputting a received power value and a carrier to noise ratio of said converted signal, and an error correcting unit for making an error correction to said digital broadcasting wave and outputting this error-corrected signal, and for outputting an error rate of said error-corrected signal, and wherein said antenna combination determination processing unit provides the instruction for switching among said plurality of antennas on a basis of the state of reception which is at least one of the received power value and the carrier to noise ratio, which are outputted from said OFDM decoder, and the error rate outputted from said error correcting unit.

8. The digital broadcasting receiving apparatus according to claim 6, wherein said antenna combination determination processing unit is provided with a timer for counting up to a predetermined time interval, and does not provide the instruction for switching among said plurality of antennas while said timer counts the predetermined time interval.

9. The digital broadcasting receiving apparatus according to claim 6, wherein said antenna combination determination processing unit stores a number of times that each and every of said plurality of switches has switched among a plurality of antennas, and, when the number of times that one of said plurality of switches has switched among a plurality of antennas exceeds a predetermined number of times, provides an instruction for making another switch among antennas.

10. The digital broadcasting receiving apparatus according to claim 7, wherein said digital broadcasting receiving apparatus includes: a plurality of antenna amplifier respectively disposed for said plurality of antennas, each for amplifying the received digital broadcasting wave; a plurality of phantom power supplies for furnishing electric power to said plurality of antenna amplifiers; and a control unit for determining which one of said plurality of antennas has been selected with reference to said switch control unit, and for stopping said phantom power supplies on a basis of a result of said determination.

* * * * *